(12) United States Patent
Okuda

(10) Patent No.: US 11,111,404 B2
(45) Date of Patent: Sep. 7, 2021

(54) PRINTING METHOD AND PRINTING APPARATUS

(71) Applicant: Seiko Epson Corporation, Tokyo (JP)

(72) Inventor: Ippei Okuda, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/574,428

(22) Filed: Sep. 18, 2019

(65) Prior Publication Data

US 2020/0087527 A1     Mar. 19, 2020

(30) Foreign Application Priority Data

Sep. 19, 2018     (JP) ............................. JP2018-175040

(51) Int. Cl.
*C09D 11/322*     (2014.01)
*B41J 2/21*     (2006.01)
(Continued)

(52) U.S. Cl.
CPC ........... *C09D 11/322* (2013.01); *B41J 2/2107* (2013.01); *B41J 2/2114* (2013.01); *B41J 2/2117* (2013.01); *C09D 11/38* (2013.01); *C08L 91/00* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 2/04588; B41J 2/04595; B41J 2/04586; B41J 2/14274; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41M 5/0011; B41M 5/0017; B41M 5/0023;
(Continued)

(56) References Cited

U.S. PATENT DOCUMENTS

2007/0076075 A1    4/2007    Schmid et al.
2011/0262724 A1    10/2011   Okuda et al.
(Continued)

FOREIGN PATENT DOCUMENTS

JP    2009-509822 A    3/2009
JP    2011-231201 A    11/2011
JP    2017-144628 A    8/2017

*Primary Examiner* — Manish S Shah
(74) *Attorney, Agent, or Firm* — Harness, Dickey & Pierce, P.L.C.

(57) ABSTRACT

A printing method includes a white ink application step of ejecting a white ink from a printing head to apply the white ink onto a printing medium, a non-white ink application step of ejecting a non-white ink containing a non-white coloring material from a printing head to apply the non-white ink onto the printing medium, and a treatment liquid application step of applying a treatment liquid containing a flocculant onto the printing medium. The white ink contains a white pigment and inorganic fine particles having a smaller volume average particle size than the white pigment.

13 Claims, 1 Drawing Sheet

(51) Int. Cl.
*C09D 11/38* (2014.01)
*C08L 91/00* (2006.01)

(58) Field of Classification Search
CPC .... B41M 5/0047; B41M 7/00; B41M 7/0072; B41M 5/52; B41M 5/5218; B41M 5/227
See application file for complete search history.

(56) References Cited

U.S. PATENT DOCUMENTS

| | | | |
|---|---|---|---|
| 2013/0135382 A1* | 5/2013 | Mitsuzawa | C09D 11/322 347/20 |
| 2015/0035898 A1* | 2/2015 | Okuda | B41J 2/01 347/20 |
| 2016/0194824 A1* | 7/2016 | Ohashi | C09D 11/107 347/20 |
| 2017/0166764 A1* | 6/2017 | Katsuragi | B41J 2/14016 |
| 2017/0232763 A1 | 8/2017 | Okuda | |

* cited by examiner

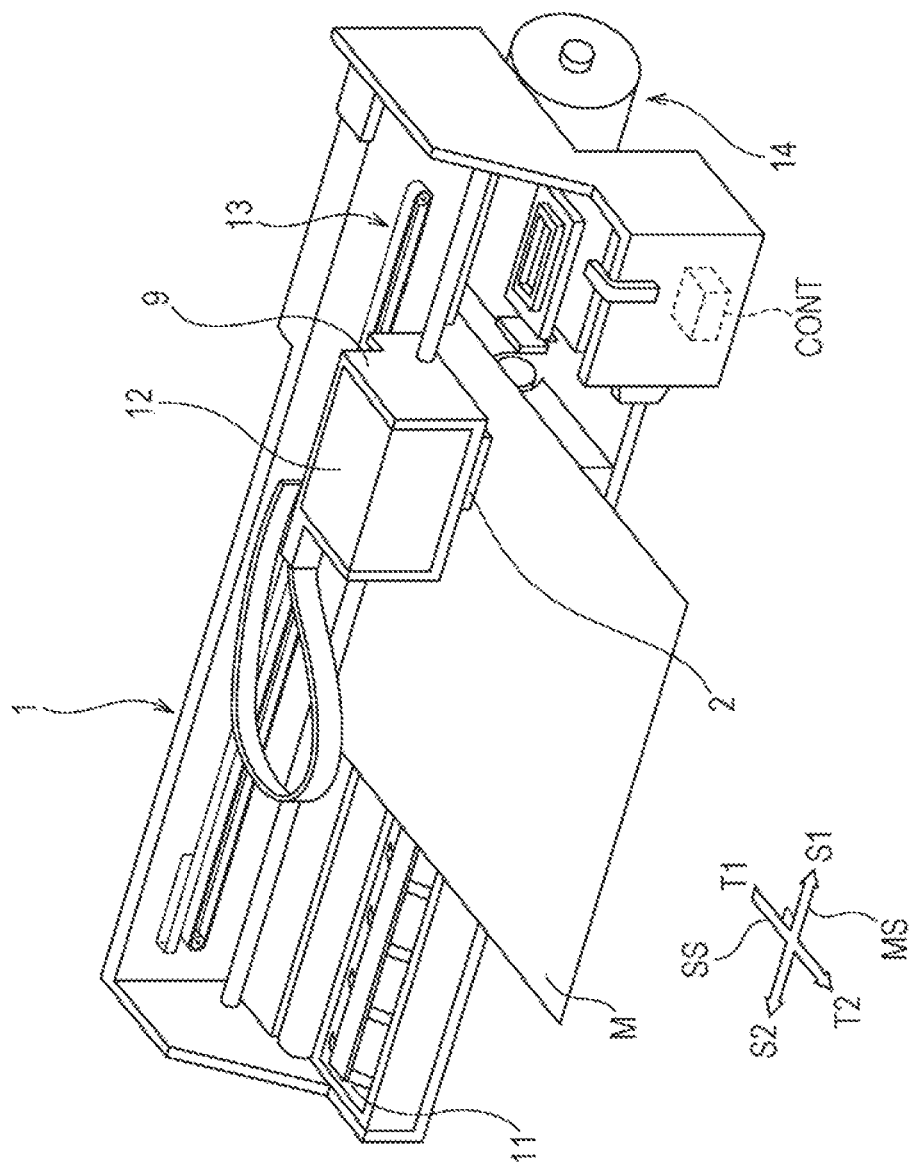

PRINTING METHOD AND PRINTING APPARATUS

The present application is based on, and claims priority from, JP Application Serial Number 2018-175040, filed Sep. 19, 2018, the disclosure of which is hereby incorporated by reference herein in its entirety.

BACKGROUND

1. Technical Field

The present disclosure relates to a printing method and a printing apparatus.

2. Related Art

Ink jet printing apparatuses are used for printing performed by ejecting ink droplets through very thin nozzles to apply the ink droplets onto a printing medium. Such an ink jet printing apparatus enables high-speed printing of high-resolution and high-quality images. Ink jet printing methods using an ink jet printing apparatus are being improved in terms of a variety of points including printing stability and quality of printed images. In addition, researches on ink, as well as researches to improve the performance of the ink jet printing apparatus, are being intensively conducted.

There is known a technique (what is called superposed application) to apply a plurality of types of liquid onto the same region of a printing medium so as to superpose the liquids. For example, JP-A-2017-144628 discloses a printing method including a white ink application step of applying a white ink onto a printing medium and a reaction liquid application step of applying a reaction liquid onto the printing medium. According to the description of this cited disclosure, printed items with a high image quality, a satisfactory L* value, and a high opacity can be produced by applying the reaction liquid and the white ink onto a region so as to superpose the liquid and the ink.

Such superposed application is a technique optionally performed as required in the ink jet printing method, and the use of a reaction liquid, which may be referred to as a treatment liquid in some cases, minimizes the degradation of image quality that may be caused by bleeding. However, the superposed application of a treatment liquid, a white ink, and a non-white ink caused printed images to crack in some cases.

SUMMARY (1) According to an aspect of the present disclosure, there is provided a printing method including a white ink application step of ejecting a white ink from a printing head to apply the white ink onto a printing medium, a non-white ink application step of ejecting a non-white ink containing a non-white coloring material from a printing head to apply the non-white ink onto the printing medium, and a treatment liquid application step of applying a treatment liquid containing a flocculant onto the printing medium. The white ink contains a white pigment and inorganic fine particles having a smaller volume average particle size than the white pigment.

(2) In the printing method of (1), the inorganic fine particles may be made of a material different from the white pigment. The material is selected from the group consisting of silica, alumina, zirconia, and zinc oxide.

(3) In the printing method of (1), the white pigment may have a volume average particle size of from 150.0 nm to 400.0 nm, and the inorganic fine particles may have a volume average particle size of from 10.0 nm to 100.0 nm.

(4) In the printing method of (1), the white ink may contain 1.0 parts by mass to 20.0 parts by mass of the inorganic fine particles relative to 100.0 parts by mass of the white pigment.

(5) In the printing method of (1), the treatment liquid may contain a cationic polymer as the flocculant.

(6) In the printing method of (1), the ratio of the viscosity of a mixture of the white ink and the treatment liquid to the viscosity of the white ink may have a difference of 5.0 or less from the ratio of the viscosity of a mixture of the non-white ink and the treatment liquid to the viscosity of the non-white ink.

(7) In the printing method of (1), at least one of the white ink and the non-white ink may contain a wax.

(8) In the printing method of (1), the printing medium may have a region having an area onto which the treatment liquid is applied in a proportion of from 5.0% by mass to 50.0% by mass relative to the total mass of the white ink and the non-white ink applied onto the area.

(9) In the printing method of (1), the treatment liquid application step may be performed before the white ink application step and the non-white ink application step.

(10) In the printing method of (1), the white ink application step may be performed before the non-white ink application step.

(11) The printing method of (1) may further include a post-application heating step of heating the printing medium after the treatment liquid application step, the white ink application step, and the non-white ink application step.

(12) In the printing method of (1), one of the white ink application step and the non-white ink application step may be a subsequent ink application step performed after the other, and a percentage of evaporable constituents in the treatment liquid and ink that are applied before the subsequent ink application step is evaporated. The percentage at the time when the subsequent ink application step is started may be from 50.0% by mass to 90.0% by mass.

(13) According to another aspect of the present disclosure, a printing apparatus configured to perform the printing method of (1) is provided.

BRIEF DESCRIPTION OF THE DRAWINGS

The FIGURE is a schematic diagram of an ink jet printing apparatus used in a printing method according to an embodiment of the present disclosure.

DESCRIPTION OF EXEMPLARY EMBODIMENTS

Some of the embodiments of the present disclosure will now be described. The following embodiments illustrate some implementations of the present disclosure. The implementation of the subject matter of the disclosure is not limited to the following embodiments, and various modifications may be made within the scope and spirit of the disclosure. All the components disclosed in the following embodiments are not necessarily essential for the subject matter disclosed herein.

The printing method disclosed herein includes a white ink application step of ejecting a white ink from a printing head to apply the white ink onto a printing medium, a non-white ink application step of ejecting a non-white ink containing a non-white coloring material from a printing head to apply the non-white ink onto the printing medium, and a treatment liquid application step of applying a treatment liquid containing a flocculant onto the printing medium. The white ink contains a white pigment and inorganic fine particles having a smaller volume average particle size than the white pigment.

1. White Ink Application Step

In the white ink application step, a white ink is ejected from a printing head to apply the white ink onto a printing medium. The white ink will now be described, and the printing medium and the ink jet printing apparatus including the printing head will be described later herein.

1. 1. White Ink

The white ink contains a white pigment and inorganic fine particles.

1. 1. 1. White Pigment

The white pigment contained in the white ink may be a metal compound, such as a metal oxide, barium sulfate, or calcium carbonate. In some embodiments, the white pigment may be an inorganic metal compound. Examples of the metal oxide include titanium dioxide, zinc oxide, silica, alumina, and magnesium oxide. The white pigment may include hollow particles, and known hollow particles may be used. In some embodiments, the material of the white pigment may be different from the material of the inorganic fine particles described later herein.

In some embodiments, titanium dioxide may be used as the white pigment from the viewpoint of increasing whiteness and rub fastness. A white pigment may be used individually, or two or more white pigments may be used in combination.

The volume-based average particle size D50 (hereinafter referred to as volume average particle size) of the white pigment is set to larger than the volume average particle size of the inorganic fine particles described later herein. For example, the volume average particle size of the white pigment may be from 30.0 nm to 600.0 nm or from 100.0 to 500.0 nm. In some embodiments, it may be from 150.0 nm to 400.0 nm. When the volume average particle size of the white pigment is in such a range, the particles of the white pigment are not likely to settle and, accordingly, the dispersion thereof can be stable. In addition, such a white pigment, when used in an ink jet printing apparatus, is not likely to clog the nozzles of the ink jet printing apparatus. Furthermore, the white pigment having a volume average particle size in such a range can provide a satisfactory whiteness or color density.

The volume average particle size of the white pigment can be measured with a particle size distribution analyzer based on a laser diffraction/scattering method. For example, a particle size distribution analyzer using dynamic light scattering (for example, Microtrac UPA manufactured by Nikkiso) may be used.

The "white" of the white ink and white pigment mentioned herein does not strictly mean perfect white and may be chromatic white, achromatic white, or glossy white, provided that the color is visually recognized as white. The white ink or white pigment may be a product that is supposed to be a white ink or white pigment from the name of the product.

In a quantitative sense, "white" is not necessarily a color having a lightness $L^*$ of 100 in the CIELAB color system and may be a color of a printed item having a lightness $L^*$ of from 60 to 100 and saturation/chroma parameters $a^*$ and $b^*$ of from −10 to +10 each.

More specifically, when a transparent film printing medium is printed with such a white ink so that the surface of the transparent printing medium is covered with a sufficient amount of the white ink, the printed portion of the printed item exhibits a lightness $L^*$ and saturation/chroma parameters $a^*$ and $b^*$ in the above ranges when measured with a spectrophotometer according to the CIELAB color scale. The sufficient amount of the white ink applied onto the printing medium for sufficient coverage may be, for example, 15 mg/inch². In some embodiments, the color of the white ink may satisfy $80 \leq L^* \leq 100$, $-4.5 \leq a^* \leq 2$, and $-10 \leq b^* \leq 2.5$. The transparent film printing medium may be, for example, LAG Jet E-1000ZC (manufactured by Lintec Corporation). The color of the printed image may be measured, for example, by using a spectrophotometer according to the CIELAB color scale, for example, Spectrolino (manufactured by GretagMacbeth), with a D50 light source at an observation viewing angle of 2° and a DIN NB density with no filter on a Abs basis in a measurement mode of Reflectance.

In the present disclosure, the pigment contained in the white ink and having the white color of the white ink is considered to be a white pigment.

The white pigment (solid) content in the white ink may be from 0.5% by mass to 20% by mass or from 1% by mass to 20% by mass relative to the total mass of the white ink. In some embodiments, it may be from 5% by mass to 15% by mass or 7% by mass to 15% by mass. When the white pigment content is in such a range, the white ink is not likely to clog the nozzles of the ink jet printing apparatus and can produce a satisfactory whiteness or color density.

The white pigment (solid) content in the white ink may be controlled so that the proportion of the inorganic fine particles can be in the range from 0.5 parts by mass to 25.0 parts by mass, for example, from 1.0 parts by mass to 20.0 parts by mass or from 1.5 parts by mass to 25.0 parts by mass, relative to 100.0 parts by mass of the white pigment.

The white pigment may be able to be stably dispersed in water. For a stable dispersion of the white pigment, a dispersant may be used. The dispersant may be a surfactant, a resin dispersant, or the like and is selected from among dispersants that can ensure a stable dispersion of the white pigment in the white ink. Alternatively, the white pigment may be surface-modified so as to be self-dispersible by oxidizing or sulfonating the surfaces of the pigment particles with ozone, hypochlorous acid, fuming sulfuric acid, or the like.

Examples of the resin dispersant may be water-soluble resins including (meth)acrylic resins and salts thereof, such as poly(meth)acrylic acids, (meth)acrylic acid-acrylonitrile copolymers, (meth)acrylic acid-(meth)acrylic ester copolymers, vinyl acetate-(meth)acrylic ester copolymers, vinyl acetate-(meth)acrylic acid copolymers, and vinyl naphthalene-(meth)acrylic acid copolymers; styrene resin and salts thereof, such as styrene-(meth)acrylic acid copolymers, styrene-(meth)acrylic acid-(meth)acrylic ester copolymers, styrene-α-methylstyrene-(meth)acrylic acid copolymers, styrene-α-methylstyrene-(meth)acrylic acid-(meth)acrylic ester copolymers, styrene-maleic acid copolymers, and styrene-maleic anhydride copolymers; urethane resins that are linear or branched polymers having a urethane bond formed by a reaction of an isocyanate group and a hydroxy group and having or not having a crosslinked structure; polyvinyl alcohols; vinyl naphthalene-maleic acid copolymers and salts thereof; vinyl acetate-maleic ester copolymers and salts thereof; and vinyl acetate-crotonic acid copolymers and salts thereof. In some embodiments, a copolymer of a monomer having a hydrophobic functional group and a monomer having a hydrophilic functional group, or a polymer formed of a monomer having both a hydrophobic functional group and a hydrophilic functional group may be used. If a copolymer is used, the copolymer may be a random copolymer, a block copolymer, an alternating copolymer, or a graft copolymer.

Styrene resin dispersants are commercially available, and examples thereof include X-200, X-1, X-205, X-220, and X-228 (each produced by SEIKO PMC Corporation); NOPCOSPERSE (registered trademark) series 6100 and 6110 (produced by San Nopco); JONCRYL series 67, 586, 611, 678, 680, 682, and 819 (produced by BASF); DISPER BYK-190 (produced by BYK); and N-EA137, N-EA157, N-EA167, N-EA177, N-EA197D, N-EA207D, and E-EN10 (each produced by Dai-ichi Kogyo Seiyaku).

Acrylic resin dispersants are also commercially available, and examples thereof include BYK-187, BYK-190, BYK-191, BYK-194N, and BYK-199 (each produced by BYK); and Aron series A-210, A6114, AS-1100, AS-1800, A-30SL, A-7250, and CL-2 (each produced by Toagosei).

Urethane resin dispersants are also commercially available, and examples thereof include BYK-182, BYK-183, BYK-184, and BYK-185 (each produced by BYK), TECO Disperse 710 (produced by Evonic Tego Chemi), and Borchi (registered trademark) Gen 1350 (produced by 0MG Borschers).

Dispersants may be used individually or in combination. The proportion of the total amount of the dispersant to be used may be from 0.1 parts by mass to 30 parts by mass or from 0.5 parts by mass to 25 parts by mass, for example, 1 part by mass to 20 parts by mass or 1.5 parts by mass to 15 parts by mass, relative to 50 parts by mass of the white pigment. When the dispersant is used in a proportion of 0.1 part by mass or more relative to 50 parts by mass of the white pigment, the dispersion of the white pigment can be further stably maintained. When the dispersant is used in a proportion of 30 parts by mass or less relative to 50 parts by mass of the white pigment, the viscosity of the white pigment dispersion is kept low.

In some embodiments, the dispersant may be at least one selected from the resin dispersants, particularly from the group consisting of acrylic resins, styrene resins, and urethane resins. In this instance, the weight average molecular weight of the dispersant may be 500 or more. Such resin dispersants are less odorous and helpful to further increase the stability of the dispersion of the white pigment.

When a resin dispersant is used, the resin dispersant content may be appropriately set according to what white pigment is used, and, for example, the resin dispersant may be added in a proportion of from 5 parts by mass to 200 parts by mass, for example, from 20 parts by mass to 120 parts by mass, relative to 100 parts by mass of the white pigment in the white ink.

The white pigment itself may be or may not be able to be flocculated by the flocculant in the treatment liquid that will be described later herein. Since whether or not the white pigment can be flocculated depends on the dispersant, the dispersant may be selected depending on the desired degree of flocculation.

1. 1. 2. Inorganic Fine Particles

The inorganic fine particles contained in the white ink may be particles of an inorganic oxide, and examples of the inorganic oxide include silica, such as colloidal silica, titanium oxide, zinc oxide, zinc sulfide, antimony oxide, magnesium oxide, aluminum oxide, and zirconium oxide, and mixtures thereof. In some embodiments, the material of the inorganic fine particles may be elected from the group consisting of silica, alumina, zirconia, and zinc oxide. The inorganic fine particles in the white ink reduce cracks in the images formed by superposing the white ink and the non-white ink. It has not been elucidated so far how the inorganic fine particles reduce cracks. The inventors assume that one of the reasons for cracks is the difference in shrinkage between the white ink and the non-white ink after being applied, and that the inorganic fine particles fill the space among the white pigment particles to suppress the occurrence of cracks. The effect of the inorganic fine particles to reduce cracks is demonstrated in the Examples and Comparative Examples described later herein.

The volume average particle size of the inorganic fine particles is smaller than that of the above-described white pigment. For example, the volume average particle size of the inorganic fine particles may be from 5.0 nm to 150.0 nm or from 10.0 to 100.0 nm. In some embodiments, it may be from 15.0 nm to 80.0 nm. The inorganic fine particles may be white or transparent. The white inorganic fine particles are such that when a coating formed by applying, for example, the dispersion of 3% by mass of the inorganic fine particles in water onto a transparent printing medium at a rate of 15 mg/inch$^2$ is subjected to the same color measurement as of the white ink, the color of the coating is determined to be white. Also, the transparent inorganic fine particles are such that when a coating formed by applying the dispersion of the inorganic fine particles prepared as above at a rate of 15 mg/inch$^2$ onto, for example, a printing medium that is determined to be white by the above-described color measurement is subjected to the same color measurement, the color of the coating is determined to be white.

Inorganic fine particles having a smaller average particles size are more likely to be transparent. The color of the inorganic fine particles may between white and transparent. Such inorganic fine particles are favorable in terms of anti-cracking property.

The material of the inorganic fine particles contained in the white ink is different from the material of the white pigment described above. For example, when the inorganic fine particles are made of silica, any other material is used as the white pigment. Use of different materials for the inorganic fine particles and the white pigment enhances the anti-cracking property and rub fastness of the white ink coating and is helpful to stably eject the ink.

The proportion of the inorganic fine particles in the white ink may be from 0.5 part by mass to 25.0 parts by mass, for example, from 1.0 part by mass to 20.0 parts by mass or 1.5 parts by mass to 25.0 parts by mass, relative to 100.0 parts by mass of the white pigment.

1. 1. 3. Other Constituents

The white ink may further contain resin particles, a water-soluble organic solvent, a surfactant, water, a wax, a resin dispersant, a preservative/fungicide agent, a rust preventive, a chelating agent, a viscosity modifier, an antioxidant, a fungicide, and other additives in addition to the white pigment.

1. 1. 3. 1. Resin Particles

The white ink may contain resin particles. The resin particles can enhance the adhesion of images printed with the white ink to the printing medium. In addition, the resin particles that are not likely to be flocculated by the treatment liquid can be uniformly dispersed over the region of the printing medium onto which the white ink is applied, thus helping the white ink form images having a reduced surface roughness.

Examples of the material of the resin particles include urethane resin, acrylic resin (styrene-acrylic resin), fluorene resin, polyolefin resin, rosin-modified resin, terpene resin, polyester resin, polyamide resin, epoxy resin, vinyl chloride resin, vinyl chloride-vinyl acetate copolymers, and ethylene vinyl acetate resin. The resin particles are often in the form of emulsion but may be used in the form of powder. The resin particles may be composed of a single material or a plurality of materials.

Urethane resin is a generic term for resins having a urethane bond. The urethane resin used herein may have other bonds in addition to the urethane bond, and examples of such a urethane rein include a polyether-type urethane resin having an ether bond in the main chain, a polyester-type urethane resin having an ester bond in the main chain, and a polycarbonate-type urethane resin having a carbonate linkage in the main chain. Commercially available urethane resins may be used, and examples thereof include Superflex series 460, 460s, 840, E-4000 (each produced by Dai-ichi Kogyo Seiyaku), Resamine series D-1060, D-2020, D-4080, D-4200, D-6300, and D-6455 (each produced by Dainichiseika Color & Chemicals Mfg.), Takelac series WS-6021 and W-512-A-6 (each produced by Mitsui Chemicals), Sancure 2710 (produced by Lubrizol), and PERMARIN UA-150 (produced by Sanyo Chemical Industries).

Acrylic resin is a generic term for polymers of one or more acrylic monomers, such as (meth)acrylic acid and (meth)acrylic acid esters and may be, for example, a resin produced from one or more acrylic monomers or a copolymer of one or more acrylic monomers and other monomers. Acrylic-vinyl resin, which is a copolymer of an acrylic monomer and a vinyl monomer, is one example of the acrylic resin. More specifically, styrene, which is a copolymer of acrylic monomer and a vinyl monomer, is an example of the acrylic-vinyl resin.

Other acrylic monomers include acrylamide and acrylonitrile. A commercially available acrylic resin emulsion may be used as the acrylic resin, and examples thereof include FK-854 (produced by CHIRIKA), MOWINYL 952B and MOWINYL 718A (each produced by Nippon Synthetic Chemical Industry), Nipol LX852 and Nipol LX874 (each produced by Nippon Zeon).

The acrylic resin used herein may be a styrene-acrylic resin described later herein. (Meth)acrylic (or (meth)acrylate) used herein refers to at least one of acrylic (or acrylate) and methacrylic (or methacrylate).

Styrene acrylic resin is a type of copolymer produced from styrene monomers and acrylic monomers, and examples thereof include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. Some styrene-acrylic resins are commercially available, and examples thereof include JONCRYL series 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (each produced by BASF), MOWINYL series 966A and 975N (each produced by Nippon Synthetic Chemical Industry), and VINYBLAN 2586 (produced by Nissin Chemical Industry).

Polyolefin resin is a type of resin having a skeleton containing an olefin, such as ethylene, propylene, or butylene, and a known olefin resin may be used. Some olefin resins are commercially available, and examples thereof include ARROWBASE series CB-1200 and CD-1200 (produced by Unitika).

The resin particles may be in the form of an emulsion, and commercially available resin particle emulsions include Micro Gel E-1002 and Micro Gel E-5002 (each styrene acrylic resin emulsion produced by Nippon Paint); VONCOAT 4001 (acrylic resin emulsion produced by DIC) and VONCOAT 5454 (styrene acrylic resin emulsion produced by DIC); Polysol series AM-710, AM-920, AM-2300, AP-4735, AT-860, and PSASE-4210E (each acrylic resin emulsion), Polysol AP-7020 (styrene acrylic resin emulsion), Polysol SH-502 (vinyl acetate resin emulsion), Polysol series AD-13, AD-2, AD-10, AD-96, AD-17, and AD-70 (each ethylene-vinyl acetate resin emulsion), and Polysol PSASE-6010 (ethylene-vinyl acetate resin emulsion) (each produced by Showa Denko); Polysol SAE1014 (styrene acrylic resin emulsion produced by Zeon Corporation); Saivinol SK-200 (acrylic resin emulsion produced by Saiden Chemical Industry); AE-120A (acrylic resin emulsion produced by JSR); AE373D (carboxy-modified styrene acrylic resin emulsion produced by Emulsion Technology Co., Ltd.); SEIKADYNE 1900W (ethylene-vinyl acetate resin emulsion produced by Dainichiseika Color & Chemicals); VINYBLAN 2682 (acrylic resin emulsion), VINYBLAN 2886 (vinyl acetate-acrylic resin emulsion), and VINYBLAN 5202 (acetic acid-acrylic resin emulsion) (each VINYBLAN produced by Nissin Chemical Industry); Elitel series KA-5071S, KT-8803, KT-9204, KT-8701, KT-8904, and KT-0507 (each polyester resin emulsion produced by Unitika); Hytec SN-2002 (polyester resin emulsion produced by Toho Chemical Industry); Takelac series W-6020, W-635, W-6061, W-605, W-635, and W-6021 (each urethane resin emulsion produced by Mitsui Chemicals); Superflex series 870, 800, 150, 420, 460, 470, 610, and 700 (each urethane resin emulsion produced by Dai-ichi Kogyo Seiyaku); PERMARIN UA-150 (urethane resin emulsion produced by Sanyo Chemical Industries); Sancure 2710 (urethane resin emulsion produced by Lubrizol); NeoRez series R-9660, R-9637, and R-940 (each urethane resin emulsion produced by Kusumoto Chemicals); ADEKA Bon-Tighter series HUX-380 and 290K (urethane resin emulsion produced by ADEKA); MOWINYL 966A and MOWINYL 7320 (each produced by Nippon Synthetic Chemical Industry); JONCRYL series 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, and 7610 (each produced by BASF); NK Binder R-5HN (produced by Shin-Nakamura Chemical); HYDRAN WLS-210 (non-crosslinked polyurethane produced by DIC); and JONCRYL 7610 (produced by BASF).

The resin particles may have a glass transition temperature (Tg) of from −50° C. to 200° C., for example, from 0° C. to 150° C. or from 50° C. to 100° C. In some embodiments, resin particles having a glass transition temperature of from 50° C. to 80° C. may be used. The use of resin particles having such a glass transition temperature tends to increase durability and reduce clogging. The glass transition temperature may be measured with, for example, a differential scanning calorimeter DSC 7000 manufactured by Hitachi High-Tech Science in accordance with JIS K7121 (Testing Method for Transition Temperatures of Plastics).

The glass transition temperature of the resin particles may be controlled by appropriately selecting the monomers used for synthesizing the resin of the particles and the proportion of the monomers in consideration of the glass transition temperatures of the monomers. The glass transition temperature of the resin of the resin particles thus can be controlled. By appropriately selecting the monomers and the proportion thereof, the acid value of the resin may be controlled to adjust the reactivity between the resin particles and the treatment liquid. The flocculation of the white ink is controlled in view of the flocculabilities of the resin particles, the white pigment, the pigment dispersant, and other constituents and the flocculability depending on the interaction among such constituents.

The volume average particle size of the resin particles may be from 10 nm to 300 nm, for example, from 30 nm to 300 nm, from 30 nm to 250 nm, or from 40 nm to 220 nm.

The resin particle content in terms of solid content, if added to the white ink, may be from 0.1% by mass to 20% by mass, for example, from 1% by mass to 15% by mass or 2% by mass to 10% by mass, relative to the total mass of the white ink.

1. 1. 3. 2. Water-Soluble Organic Solvent

The white ink used in the printing method according to an embodiment of the present disclosure may contain a water-soluble organic solvent. The water-soluble organic solvent functions to increase the wettability of the white ink on the printing medium and increase the moisture-retaining property of the white ink. The water-soluble organic solvent may be an ester, an alkylene glycol ether, a cyclic ester, a nitrogen-containing solvent, or a polyhydric alcohol. The nitrogen-containing solvent may be a cyclic amide or an acyclic amide. The acyclic amide may be an alkoxyalkylamide.

Examples of the ester include glycol monoacetates, such as ethylene glycol monoethyl ether acetate, ethylene glycol monomethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, and methoxybutyl acetate; and glycol diesters, such as ethylene glycol diacetate, diethylene glycol diacetate, propylene glycol diacetate, dipropylene glycol diacetate, ethylene glycol acetate propionate, ethylene glycol acetate butylate, diethylene glycol acetate butylate, diethylene glycol acetate propionate, diethylene glycol acetate butylate, propylene glycol acetate propionate, propylene glycol acetate butylate, dipropylene glycol acetate butylate, and dipropylene glycol acetate propionate.

Examples of the alkylene glycol ether include alkylene glycol monoethers and alkylene glycol diethers and may be an alkyl ether. More specifically, examples of such an alkylene glycol ether include alkylene glycol monoalkyl ethers, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, and tripropylene glycol monobutyl ether; and alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methylethyl ether, diethylene glycol methylbutyl ether, triethylene glycol dimethyl ether, triethylene glycol diethyl ether, triethylene glycol dibutyl ether, triethylene glycol methylbutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and tripropylene glycol dimethyl ether.

In some embodiments, alkylene glycol diethers may be more beneficial than alkylene glycol mono ethers. Alkylene glycol diethers are more likely to dissolve the resin particles in the ink or cause the resin particles to become distended, thus increasing the rub fastness of the resulting image.

Exemplary cyclic esters include lactones, such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nanolactone, ε-nanolactone, and ε-decanolactone; and compounds derived from these lactones by substituting an alkyl group having a carbon number of 1 to 4 for the hydrogen of the methylene group adjacent to the carbonyl group of the lactone.

Examples of the alkoxyalkylamide include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, and 3-tert-butoxy-N,N-methylethylpropionamide.

Examples of the cyclic amide include lactams, such as 2-pyrrolidone, 1-methyl-2-pyrrolidone, 1-ethyl-2-pyrrolidone, 1-propyl-2-pyrrolidone, and 1-butyl-2-pyrrolidone. These cyclic amides are beneficial for increasing the solubility of the flocculant and facilitating the formation of the coating of the resin particles, and 2-pyrrolidone is more beneficial.

The alkoxyalkylamide may be a compound represented by the following general formula (1):

$$R^1-O-CH_2CH_2-(C=O)-NR^2R^3 \qquad (1)$$

In formula (1), $R^1$ represents an alkyl group having a carbon number of 1 to 4, and $R^2$ and $R^3$ each independently represent a methyl group or an ethyl group. The alkyl group having a carbon number of 1 to 4 may be linear or branched, and examples thereof include methyl, ethyl, n-propyl, isopropyl, n-butyl, sec-butyl, isobutyl, and tert-butyl. Compounds represented by formula (1) may be used individually or in combination.

The compound represented by formula (1) functions, for example, to help the white ink applied onto a poorly absorbent printing medium to dry rapidly and to enhance the fixability of the white ink to the printing medium. In particular, the compound represented by formula (1) can favorably soften or dissolve vinyl chloride resin. Accordingly, the compound represented by formula (1) can soften or dissolve the printing surface containing a vinyl chloride resin and allow the white ink to permeate into the poorly absorbent printing medium. The permeated white ink becomes likely to be fixed firmly to the printing medium and to dry readily at the surface. Thus, the resulting image is likely to have well-dried surface and to be firmly fixed.

In some embodiments, $R^1$ in formula (1) may be the methyl group, which has a carbon number of 1. The normal boiling point of the compound having a methyl group as $R^1$ is lower than the normal boiling point of the compounds of formula (1) in which $R^1$ represents an alkyl group having a carbon number of 2 to 4. Accordingly, the use of a compound of formula (1) in which $R^1$ represents a methyl group helps the surface of the region onto which the white ink is applied to dry more satisfactorily (particularly in the case of high-temperature and high-humidity printing).

The content of the compound of formula (1), if used, may be, but is not limited to, from about 5% by mass to about 50% by mass or from 8% by mass to 48% by mass relative to the total mass of the white ink. When the content of the compound of formula (1) is in such a range, the resulting image can be firmly fixed and have a satisfactorily dried surface (particularly in the case of high-temperature, high-humidity printing).

Examples of the polyhydric alcohol include 1,2-alkanediols, such as ethylene glycol, propylene glycol (also known as propane-1,2-diol), 1,2-butanediol, 1,2-pentanediol, 1,2-hexanediol, 1,2-heptanediol, and 1,2-octanediol; and other polyhydric alcohols (polyols), such as diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerin.

The polyhydric alcohol may be an alkanediol or a polyol. The alkanediol diol is a diol of an alkane having a carbon number of 5 or more. The carbon number of the alkane may be from 5 to 15, from 6 to 10, or from 6 to 8. In some embodiments, 1,2-alkanediol may be selected.

The polyol is a polyol derived from an alkane having a carbon number of 4 or less or in the form of a condensate produced by condensation between some hydroxy groups of polyol molecules derived from one or more alkanes having a carbon number of 4 or less. The carbon number of the alkane may be 2 or 3. The number of hydroxy groups in the polyol molecule is 2 or more and may be 5 or less or 3 or less. When the polyol is in the form of an intermolecular condensate, the number of intermolecular condensations is 2 or more and may be 4 or less or 3 or less. Polyhydric alcohols may be used individually or in combination.

Alkanediols and polyols function mainly as a penetrating solvent and/or a moisturizing agent. Alkanediols are rather penetrating solvents, and polyols are rather moisturizing agents.

For the white ink containing a water-soluble organic solvent, the water-soluble organic solvent may be composed of a single compound or a combination of a plurality of compounds. The total content of the water-soluble organic solvent in the white ink may be, for example, from 5% by mass to 50% by mass, from 10% by mass to 45% by mass, from 15% by mass to 40% by mass, or from 20% by mass to 40% by mass relative to the total mass of the white ink. When the water-soluble organic solvent content is in such a range, the white ink exhibits a good balance between wettability and drying and can easily form high-quality images.

The content in the white ink of the polyol added as an organic solvent that is liquid at 25° C. and has a normal boiling point of more than 280° C. may be 5% by mass or less relative to the total mass of the white ink. In an embodiment, the content of such a polyol may be 3% by mass or less, 1% by mass or less, or 0.5% by mass or less. The lower limit of the content of such a polyol may be 0% by mass, and such a polyol may not be contained. Such a white ink can dry favorably when applied onto the printing medium and exhibit a high adhesion to the printing medium. From such viewpoints, the content of the organic solvent (not limited to polyol) that is liquid at 25° C. and has a normal boiling point of more than 280° C. may be adjusted in any of the ranges just mentioned above. Examples of the organic solvent having a normal boiling point of more than 280° C. include glycerin and polyethylene glycol monomethyl ether.

The white ink may contain a solvent containing nitrogen (hereinafter referred to as nitrogen-containing solvent) with a content of from 1% by mass to 25% by mass, for example, from 1% by mass to 20% by mass, from 5% by mass to 20% by mass, or from 5% by mass to 17% by mass, from the viewpoint of increasing rub fastness.

The polyhydric alcohol content in the white ink may be 1% by mass to 27% by mass, for example, from 5% by mass to 15% by mass or from 7% by mass to 13% by mass, from the viewpoint of increasing rub fastness.

1. 1. 3. 3. Surfactant

The white ink may contain a surfactant. The surfactant reduces the surface tension to increase the wettability of the white ink on the printing medium. In some embodiments, an acetylene glycol-based surfactant, a silicone surfactant, or a fluorosurfactant may be used.

Examples of the acetylene glycol-based surfactant include, but are not limited to, Surfynol series 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (each produced by Air Products and Chemicals Inc.); Olfine series B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (each produced by Nissin Chemical Industry); and Acetylenol series E00, E00P, E40, and E100 (each produced by Kawaken Fine Chemical).

The silicone surfactant may be, but is not limited to, a polysiloxane-based compound. For example, a polyether-modified organosiloxane may be used as the polysiloxane-based compound. The polyether-modified organosiloxane is commercially available, and examples thereof include BYK-306, BYK-307, BYK-333, BYK-341, BYK-345, BYK-346, and BYK-348 (each produced by BYK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (each produced by Shin-Etsu Chemical).

The fluorosurfactant may be a fluorine-modified polymer, and examples thereof include BYK-3440 (produced by BYK), Surflon series S-241, S-242, and S-243 (each produced by AGC Seimi Chemical), and Ftergent 215M (produced by Neos).

Surfactants, if added to the white ink, may be used individually or in combination. The content of the surfactant, if added, may be from 0.1% by mass to 2% by mass, for example, from 0.4% by mass to 1.5% by mass or from 0.5% by mass to 1.0% by mass, relative to the total mass of the white ink.

1. 1. 3. 4. Water

The white ink used in the printing method according to an embodiment of the present disclosure may contain water. In some embodiments, the white ink may be aqueous. Herein, "aqueous" in relation to a composition denotes a composition containing water as one of the major solvents. Water may be one of the major solvents contained in the white ink and is a constituent that will be evaporated by drying. Beneficially, the water is pure water or ultra-pure water from which ionic impurities have been removed as much as possible, such as ion exchanged water, ultrafiltered water, reverse osmosis water, or distilled water. Sterile water prepared by, for example, UV irradiation or addition of hydrogen peroxide may be used. Sterile water can reduce the occurrence of mold or bacteria and the use thereof is advantageous for storing ink for a long time. The water content in the white ink may be 45% by mass or more, for example, from 50% by mass to 98% by mass or from 55% by mass to 95% by mass, relative to the total mass of the white ink.

1. 1. 3. 5. Wax

The white ink may contain a wax. The wax has a function to impart gloss and smoothness to the image printed with the white ink, thus reducing separations of printed images.

Examples of the wax include vegetable or animal waxes, such as carnauba wax, candelilla wax, beeswax, rice wax, and lanolin; petrolatum waxes, such as paraffin wax, microcrystalline wax, polyethylene wax, oxidized polyethylene wax, and petrolatum; mineral waxes, such as montan wax and ozokerite; synthetic waxes, such as carbon wax, Hoechst wax, polyolefin wax, and stearic acid amide; natural or synthetic wax emulsions, such as α-olefin-maleic anhydride copolymer; and blended waxes. These waxes may be used individually or in combination. In some embodiments, a polyolefin wax (particularly polyethylene wax or polypropylene wax) or a paraffin wax may be used. These waxes are favorable in terms of increasing the fixability of the ink to flexible packaging films.

A commercially available wax may be used as it is, and examples thereof include NOPCOTE PEM-17 (produced by San Nopco), CHEMIPEARL W4005 (produced by Mitsui Chemicals), and AQUACER series 515, 539, and 593 (each produced by BYK).

In some embodiments, a wax having a melting point of from 50° C. to 200° C., from 70° C. to 180° C., or from 90° C. to 150° C. may be selected from the viewpoint of preventing the wax from being melted and degraded in performance by heating that may be performed in the printing method.

The wax may be in the form of emulsion or suspension The wax content in the white ink may be from 0.1% by mass to 10% by mass, from 0.5% by mass to 5% by mass, or from 0.5% by mass to 2% by mass, relative to the total mass of the white ink. When the wax content is in such a range, the wax can function appropriately as intended. When at least one of the white ink and the non-white ink that will be described later herein contains any of the above-described waxes, satisfactorily glossy and smooth images can be printed.

1. 1. 3. 6. Other Additives

The white ink may contain a urea compound, an amine compound, a saccharide, or the like as an additive. Examples of the urea compound include urea, ethyleneurea, tetramethylurea, thiourea, 1,3-dimethyl-2-imidazolidinone, and betaines, such as trimethylglycine, triethylglycine, tripropylglycin, triisopropylglycine, N,N,N-trimethylalanine, N,N,N-triethylalanine, N,N,N-triisopropylalanine, N,N,N-trimethylmethylalanine, carnitine, and acetylcarnitine.

Examples of the amine compound include diethanolamine, triethanolamine, and triisopropanolamine. The urea compound and/or the amine compound may be added as a pH adjuster.

Examples of the saccharide include glucose, mannose, fructose, ribose, xylose, arabinose, galactose, aldonic acid, glucitol (sorbitol), maltose, cellobiose, lactose, sucrose, trehalose, and maltotriose.

1. 1. 3. 7. Other Ingredients

The white ink used in the printing method according to an embodiment of the present disclosure may further contain a preservative/fungicide agent, a rust preventive, a chelating agent, a viscosity modifier, an antioxidant, or a fungicide, if necessary.

1. 2. Physical Properties of White Ink and Application of White Ink onto Printing Medium When the white ink is mixed with the treatment liquid described later herein, one or more constituents of the white ink are flocculated by the effect of the flocculant. In addition, the viscosity of the white ink is increased by mixing the white ink with the treatment liquid.

Here, for an increase in viscosity of the white ink when the white ink is mixed with the treatment liquid, the "factor of viscosity increase" or "viscosity increase factor" will now be defined. The factor of viscosity increase or viscosity increase factor used herein is the ratio of the viscosity of the mixture prepared by mixing the white ink and the treatment liquid in a ratio of 10:1 with stirring to the viscosity of the white ink before being mixed. The viscosities are measured at 20° C. Hence, the factor of viscosity increase refers to the ratio of the viscosity after mixing to the viscosity before mixing. The factor of viscosity increase depends on the compositions of the white ink and the treatment liquid but is beneficially from 0.5 to 10.0. Since the white ink is thinned by being mixed, the viscosity of the mixture may be reduced, in a case, to less than 1.0 from the viscosity before mixing, depending on the compositions of the treatment liquid and the white ink. Even in such a case, the term "factor of viscosity increase" is used as the designation of a measure of the above-described viscosity changes. The lower limit of the factor of viscosity increase of the white ink may be 1.0 or more, beneficially, 1.1 or more. Also, the upper limit of the factor of viscosity increase of the white ink may be 3.0 or less, beneficially, 2.0 or less. When the factor of viscosity increase is in such a range, the white ink can be stably ejected and can improve the anti-cracking property and rub fastness of the printed image.

The factor of viscosity increase of the white ink can be controlled by appropriately selecting the white pigment and/or the resin (resin dispersant and/or resin particles) added to the white ink and the contents thereof and varying the composition of the treatment liquid. In other words, the factor of viscosity increase may be checked in advance by mixing the treatment liquid and white ink to be used in the printing method. Thus, the factor of viscosity increase of the white ink may be adjusted based on the previously measured factor.

The white ink is applied onto the printing medium by an ink jet method. Accordingly, the viscosity at 20° C. of the white ink before mixing is set to from 1.5 mPa·s to 15 mPa·s, for example, from 1.5 mPa·s to 7 mPa·s or from 1.5 mPa·s to 5.5 mPa·s. The ink jet method facilitates efficient formation of desired images on the printing medium with the white ink.

The surface tension at 25° C. of the white ink used in the printing method disclosed herein may be 40 mN/m or less, for example, 38 mN/m or less, 35 mN/m or less, or 30 mN/m or less, from the viewpoint of appropriately spreading to wet the printing medium. The surface tension can be determined by measuring the composition wetting a platinum plate at 25° C. with an automatic surface tensiometer CBVP-Z (manufactured by Kyowa Interface Science).

2. Non-White Ink Application Step

In the non-white ink application step, a non-white ink is ejected from a printing head to apply the non-white ink onto the printing medium.

2. 1. Non-White Ink

The non-aqueous ink contains a non-white coloring material.

2. 1. 1. Non-White Coloring Material

Non-white coloring materials refer to coloring materials other than the white pigment described above. The non-white coloring material may be a dye, a pigment, or the like. The non-white coloring material may be a coloring material for a chromatic color, such as cyan, yellow, and magenta, and an achromatic color other than white, such as black.

The non-white coloring material may be a dye or a pigment or a mixture thereof. In some embodiments, a pigment may be used rather than a dye. Pigments are resistant to light, weather, gases, and the like and are thus stable in storage. Organic pigments are superior in this viewpoint.

Examples of the pigments include azo pigments such as insoluble azo pigments, condensed azo pigments, azo lake, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigments; dye chelates, dye lakes, nitro pigments, nitroso pigments, aniline black, daylight fluorescent pigments, and carbon black. These pigments may be used individually or in combination. A glittering pigment may be used as the non-white coloring material.

More specific examples of the pigment include, but are not limited to, the following.

Examples of black pigments include No. 2300, No. 900, MCF 88, No. 33, No. 40, No. 45, No. 52, MA 7, MA 8, MA 100, and No. 2200B (each produced by Mitsubishi Chemical Corporation); Raven 5750, Raven 5250, Raven 5000, Raven 3500, Raven 1255, and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by CABOT); and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (each produced by Degussa).

Examples of yellow pigments include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

Examples of cyan pigments include C.I. Pigment Blues 1, 2, 3, 15, 15:1, 15:2, 15:3, 15:34, 15:4, 16, 18, 22, 25, 60, 65, and 66; and C.I. Vat Blues 4 and 60.

Pigments other than magenta, cyan, and yellow pigments include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

Examples of pearl pigments include, but are not limited to, pigments exhibiting pearly gloss or interference gloss, such as titanium dioxide-coated mica, fish scale foil, and bismuth trichloride.

Examples of metallic pigments include, but are not limited to, elemental metals, such as aluminum, silver, gold, platinum, nickel, chromium, tin, zinc, indium, titanium, and copper, and alloys thereof.

Examples of the dye used in the method disclosed herein may be selected from various types of dye generally used for ink jet printing, such as direct dyes, acid dyes, food dyes, basic dyes, reactive dyes, disperse dyes, vat dyes, soluble vat dyes, and reactive disperse dyes.

The non-white coloring material may be able to be stably dispersed or dissolved in water. For a stable dispersion of the non-white coloring material, a dispersant may be used as needed. The dispersant may be the same dispersant used in the white ink for stable dispersion of the white pigment.

The non-white coloring material content in the non-white ink may be from 0.3% by mass to 20% by mass or from 0.5% by mass to 15% by mass relative to the total mass of the non-white ink. The non-white coloring material may be flocculable or less flocculable. From the viewpoint of reducing bleeding, a flocculable material may be used.

The volume average particle size of the pigment used as the non-white coloring material (before being mixed with the treatment liquid) may be from 10 nm to 300 nm, for example, from 30 nm to 250 nm, from 50 nm to 250 nm, or from 70 nm to 200 nm. The volume average particle size of the non-white coloring material is measured as that in the initial state by the method described above. Non-white coloring materials having such a volume average particle size are easily available and whose properties can be easily adjusted as desired.

2. 1. 2. Other Constituents

The non-white ink may further contain resin particles, a water-soluble organic solvent, a surfactant, water, a wax, a resin dispersant, a preservative/fungicide agent, a rust preventive, a chelating agent, a viscosity modifier, an antioxidant, a fungicide, and other additives in addition to the non-white coloring material.

These constituents are the same as those described for the white ink, provided that the white ink in the description is replaced with the non-white ink, and thus description thereof is omitted. When at least one of the white ink and the non-white ink contains a wax, satisfactorily glossy and smooth images can be printed. The non-white ink may contain inorganic fine particles.

The content of the inorganic fine particles, if contained, may be from 0.1% by mass to 2% by mass, for example, from 0.2% by mass to 1% by mass or 0.3% by mass to 0.7% by mass, relative to the total mass of the non-white ink.

2. 2. Physical Properties of Non-White Ink and Application of Non-White Ink onto Printing Medium When the non-white ink is mixed with the treatment liquid described later herein, one or more constituents of the ink is flocculated by the effect of the flocculant as in the case of the white ink. In addition, the viscosity of the non-white ink is increased by mixing the non-white ink with the treatment liquid.

Here, for the increase in viscosity of the non-white ink when the non-white ink is mixed with the treatment liquid, the "factor of viscosity increase" or "viscosity increase factor" is defined as in the case of the white ink. The lower limit of the viscosity increase factor of the non-white ink may be 1.5 or more, for example, 2.0 or more, 3.0 or more, or 4.0 or more. Also, the upper limit of the viscosity increase factor of the non-white ink may be 10.0 or less, for example, 7.0 or less or 5.0 or less. When the factor of viscosity increase is in such a range, the non-white ink can be stably ejected and can improve the anti-cracking property and rub fastness of the printed image.

The viscosity increase factor of the non-white ink can be controlled by appropriately selecting the non-white coloring material and/or the resin (resin dispersant and/or resin particles) added to the non-white ink and the contents thereof and varying the composition of the treatment liquid. In other words, the factor of viscosity increase can be checked in advance by mixing the treatment liquid and non-white ink to be used in the printing method. Thus, the factor of viscosity increase of the non-white ink may be adjusted based on the previously measured factor.

The non-white ink is applied onto the printing medium by an ink jet method. Accordingly, the viscosity at 20° C. of the non-white ink before mixing is set to from 1.5 mPa·s to 15 mPa·s, for example, from 1.5 mPa·s to 7 mPa·s or from 1.5 mPa·s to 5.5 mPa·s. The ink jet method facilitates efficient formation of desired images on the printing medium with the non-white ink.

The surface tension at 25° C. of the non-white ink used in the printing method disclosed herein may be 40 mN/m or less, for example, 38 mN/m or less, 35 mN/m or less, or 30 mN/m or less, from the viewpoint of appropriately spreading to wet the printing medium. The surface tension of the non-white ink is measured in the same manner as that of the white ink.

3. Treatment Liquid Application Step

In the treatment liquid application step, the treatment liquid is applied onto the printing medium.

3. 1. Treatment Liquid

The treatment liquid contains a flocculant.

3. 1. 1. Flocculant

The treatment liquid contains a flocculant capable of flocculating one or more constituents of the inks (the white ink and the non-white ink). The flocculant reacts with the pigment or coloring material and/or the resin particles contained in the inks to flocculate the pigment or coloring material and/or the resin particles. The degree of flocculation of the pigment or coloring material and/or the resin particles by the flocculant depends on the flocculant, the pigment or coloring material, and the resin particles and can be adjusted by appropriately selecting these constituents. Also, the flocculant reacts with the pigment or coloring material and/or the resin particles contained in the inks to flocculate the pigment or coloring material and/or the resin particles, as described above. Such flocculation enhances the color development of the pigment or coloring material, the fixability of resin particles, and/or the viscosity of the inks.

The flocculant may be, but is not limited to, a metal salt, an inorganic acid, an organic acid, or a cationic compound. The cationic compound may be a cationic resin (cationic polymer) or a cationic surfactant. A polyvalent metal salt may be selected as the metal salt, or a cationic resin may be selected as the cationic compound. In some embodiments, the flocculant may be selected from among cationic resins, organic acids, and polyvalent metal salts from the viewpoint of producing printed items with high image quality and satisfactory rub fastness and gloss.

Although polyvalent metal salts are beneficial as the metal salt, a metal salt other than polyvalent metal salts may be used. In an embodiment, the flocculant may be at least one selected from the group consisting of metal salts and organic acids because these compounds are highly reactive with one or more constituents contained in the inks. If a cationic compound is used, a cationic resin may be selected. Cationic resins are likely to be soluble in the treatment liquid. The flocculant may be a combination of a plurality of compounds.

Polyvalent metal salts are composed of a divalent or higher-valent metal ion and an anion. Examples of the divalent metal ion include calcium ion, magnesium ion, copper ion, nickel ion, zinc ion, barium ion, aluminum ion, titanium ion, strontium ion, chromium ion, cobalt ion, and ferrous ion. In some embodiments, at least one of calcium ion or magnesium ion may be selected as the metal ion of the polyvalent metal salts. Calcium and magnesium ions are beneficial for flocculating one or more constituents of the inks.

The counter anion of the polyvalent metal salt may be an inorganic anion or an organic anion. Hence, the polyvalent metal salt used in the treatment liquid is a salt composed of an inorganic or organic anion and a polyvalent metal ion. Examples of the inorganic anion include chloride ion, bromide ion, iodide ion, nitrate ion, sulfate ion, and hydroxide ion. Examples of the organic anion include organic acid ions, such as carboxylate ions.

The polyvalent metal compound may be a polyvalent ionic metal salt. In particular, magnesium salts and calcium salts can stabilize the treatment liquid. Also, the counter ion of the polyvalent metal ion may be an inorganic acid ion or an organic acid ion.

Examples of the polyvalent metal salt include calcium carbonate including heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium acetate, magnesium acetate, and aluminum acetate. These polyvalent metal salts may be used individually or in combination. In some embodiments, at least one salt of magnesium sulfate, calcium nitrate, and calcium chloride may be used, and calcium nitrate may be more beneficial. These metal salts are sufficiently soluble in water, and the use thereof tends to reduce traces of the treatment liquid (to make traces less noticeable). The raw material of the metal salt may contain hydrated water.

In an embodiment, a monovalent metal salt, such as a sodium salt or a potassium salt, may be used as an alternative to the polyvalent metal salt, and examples of such a monovalent metal salt include sodium sulfate and potassium sulfate.

Examples of the organic acid include poly(meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furancarboxylic acid, pyridinecarboxylic acid, coumaric acid, thiophenecarboxylic acid, nicotinic acid, and derivatives or salts of these acids. Such organic acids may be used individually or in combination. Metal salts of the organic acid salts are considered to be members of the above-described group of metal salts.

Examples of the inorganic acid include sulfuric acid, hydrochloric acid, nitric acid, and phosphoric acid. Inorganic acids may be used individually or in combination.

Examples of the cationic resin (cationic polymer) include cationic urethane resin, cationic olefin resin, cationic amine resin, and cationic surfactants. The cationic polymer may be soluble in water.

A commercially available cationic urethane resin may be used, and examples thereof include HYDRAN series CP-7010, CP-7020, CP-7030, CP-7040, CP-7050, CP-7060, and CP-7610 (each produced by DIC); SUPERFLEX series 600, 610, 620, 630, 640, and 650 (each produced by Dai-ichi Kogyo Seiyaku); and Urethane Emulsions WBR-2120C and WBR-2122C (each produced by Taisei Fine Chemical).

Cationic olefin resin has a skeleton containing an olefin, such as ethylene or propylene. Any known olefin resin may be used as the flocculant. The cationic olefin resin may be dispersed in a solvent, such as water or an organic solvent, thus being in the form of an emulsion. A commercially available cationic olefin resin may be used, and examples thereof include Arrowbase series CB-1200 and CD-1200 (produced by Unitika).

The cationic amine resin (cationic amine polymer) is not particularly limited provided that it has an amino group in the molecule and may be selected from among known cationic amines. For example, the cationic amine resin may be polyamine resin, polyamide resin, or polyallylamine resin. Polyamine resin is a resin having an amino group in the main skeleton of the resin. Polyamide resin is a resin having an amide group in the main skeleton of the resin. Polyallylamine resin is a resin having a structure derived from the allyl group in the main skeleton of the resin.

Examples of the cationic polyamine resin include UNISENCE KHE 103L (aqueous solution of hexamethylenediamine-epichlorohydrin resin with a solids content of 50% by mass, 1% aqueous solution thereof has a pH of about 5.0 and a viscosity of from 20 mPa·s to 50 mPa·s) and UNISENCE KHE104L (aqueous solution of dimethylamine-epichlorohydrin resin with a solids content of 20% by mass, 1% aqueous solution thereof has a pH of about 7.0 and a viscosity of from 1 mPa·s to 10 mPa·s), each produced by SENKA Corporation. Other cationic polyamine resins are also commercially available, and examples thereof include FL-14 (produced by SNF), ARAFIX series 100, 251S, 255, and 255LOX (each produced by Arakawa Chemicals), DK-6810, DK-6853, DK-6885, WS-4010, WS-4011, WS-4020, WS-4024, WS-4027, and WS-4030 (each produced by Seiko PMC Corporation), PAPYOGEN P-105 (produced by SENKA Corporation), Sumirez Resins 650 (30), 675A, 6615, and SLX-1 (each produced by Taoka Chemical), Catiomaster (registered trademark) series PD-1, PD-7, PD-30, A, PDT-2, PE-10, PE-30, DT-EH, EPA-SK01, and TMHMDA-E (each produced by Yokkaichi Chemical), and JETFIX series 36N, 38A, and 5052 (produced by Satoda Chemical Industrial).

Examples of the polyallylamine resin include polyallylamine hydrochloride, polyallylamine amidosulfate, allylamine hydrochloride-diallylamine hydrochloride copolymer, allylamine acetate-diallylamine acetate copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymer, diallylmethylethylammonium ethylsulfate-sulfur dioxide copolymer, methyldiallylamine hydrochloride-sulfur dioxide copolymer, diallyldimethylammonium chloride-sulfur dioxide copolymer, and diallyldimethylammonium chloride-acrylamide copolymer.

Examples of the cationic surfactant include: primary, secondary, or tertiary amine salts including alkyl amine salts, dialkyl amine salts, and aliphatic amine salts; quaternary ammonium salts, such as benzalkonium salts and other quaternary alkyl ammonium salts, alkyl pyridinium salts, sulfonium salts, phosphonium salts, onium salts, and imidazolinium salts. More specifically, examples of such a cationic surfactant include hydrochlorides or acetates of laurylamine, palm amine, and rosin amine, lauryltrimethylammonium chloride, cetyltrimethylammonium chloride, benzyltributylammonium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, and octadecyldimethylammonium chloride.

A plurality of flocculants may be used in combination. Furthermore, by selecting at least one of a polyvalent metal salt, an organic acid, and a cationic resin from among the flocculants cited above, the treatment liquid can exhibit an appropriate flocculating function, thus helping to form high-quality images (particularly in terms of color development).

The flocculant content in the treatment liquid may be from 0.1% by mass to 20% by mass, for example, from 1% by mass to 20% by mass or from 2% by mass to 15% by mass, relative to the total mass of the treatment liquid. Even when a flocculant in the form of a solution or a dispersion is added into the treatment liquid, the flocculant content in terms of solid content may be in such a range. When the flocculant content is 1% by mass or more, the flocculant can sufficiently flocculate one or more constituents of the inks. In addition, when the flocculant content is 30% by mass or less, the flocculant is likely to dissolve or disperse sufficiently in the treatment liquid, increasing the storage stability of the treatment liquid.

Beneficially, the solubility of the flocculant in 100 g of water at 25° C. is 1 g or more, for example, from 3 g to 80 g, so that the flocculant can be soluble in the treatment liquid even if the treatment liquid contains a hydrophobic organic solvent.

3. 1. 2. Other Constituents

The treatment liquid may further contain resin particles, a water-soluble organic solvent, a surfactant, water, a wax, a resin dispersant, a preservative/fungicide agent, a rust preventive, a chelating agent, a viscosity modifier, an antioxidant, a fungicide, and other additives in addition to the flocculant. These constituents are the same as those described for the white ink, and thus description thereof is omitted.

3. 2. Physical Properties of Treatment Liquid and Application of Treatment Liquid onto Printing Medium The surface tension at 25° C. of the treatment liquid used in the printing method disclosed herein may be 40 mN/m or less, 38 mN/m or less, 35 mN/m or less, or 30 mN/m or less from the viewpoint of appropriately spreading to wet the printing medium. The surface tension can be determined by measuring the composition wetting a platinum plate at 25° C. with an automatic surface tensiometer CBVP-Z (manufactured by Kyowa Interface Science).

For application onto the printing medium, the treatment liquid may be ejected by an ink jet method or painting, or the treatment liquid may be sprayed onto the printing medium. Alternatively, the printing medium may be soaked with the treatment liquid or painted with a brush or the like. Thus, the treatment liquid may be applied onto the printing medium in a contacting manner or a non-contacting manner or by a combination thereof.

In some embodiments, the treatment liquid may be applied onto the printing medium by an ink jet method. In this instance, the viscosity of the treatment liquid at 20° C. may be controlled to from 1.5 mPa·s to 15 mPa·s, for example, from 1.5 mPa·s to 7 mPa·s or from 1.5 mPa·s to 5.5 mPa·s. The ink jet method facilitates efficient application of the treatment liquid onto a predetermined region of the printing medium.

4. Other Steps

The printing method disclosed herein includes the steps of applying the treatment liquid, the white ink, and the non-white ink respectively onto the printing medium. The printing method may further include a step of optionally applying at least one of the treatment liquid, the white ink, and the non-white ink onto the printing medium. In addition, these steps may be performed any times in any order. Beneficially, the treatment liquid and the inks are applied onto the same area of the printing medium.

4. 1. Post-Application Heating Step

The printing method disclosed herein may further include a step of heating the printing medium after the application of the treatment liquid and each application of the inks (post-application heating step). This heating step may be performed, if an ink jet printing apparatus is used, with an appropriate drying device (heating device or the like). Any appropriate drying device may be used without limitation to the heating device of the ink jet printing apparatus. By drying the printing medium with a drying device, the printed image can be sufficiently fixed, and the resulting printed item can be used immediately after printing.

In this instance, the temperature of the printing medium is not particularly limited but may be set in view of, for example, the glass transition temperature (Tg) of the resin of the resin particles contained in the printed item. When the Tg of the resin of the resin particles is taken into account, the temperature of the printing medium may be set at a temperature higher than the Tg of the resin of the resin particles by 5° C. or more, for example, by 10° C. or more.

More specifically, by post-application heating, the printing medium may be heated to a temperature of from 40° C. to 120° C., for example, from 50° to 120° C. or from 60° C. to 110° C. When the printing medium is heated to such a temperature, the resin particles in the printed item can be formed into a coating and thus form a flat surface, and the image of the printed item can be dried and sufficiently fixed.

5. Relationship Between Viscosity Increase Factors of Inks

In the printing method disclosed herein, the white ink and the non-white ink have a relationship in viscosity increase factor therebetween. Beneficially, the difference in viscosity increase factor between the white ink and the non-white ink is 10.0 or less, for example, 7.0 or less, 5.0 or less, or 4.0 or less. In some embodiments, it may be 3.0 or less. Also, the difference may be 0.5 or more, for example, 1 or more, 2 or more, or 3 or more. Beneficially, the non-white ink exhibits a larger viscosity increase factor than the white ink.

Inks having a difference in viscosity increase factor in such a range can form images with a reduced number of cracks, and such inks can be freely designed as desired. If both the white ink and the non-white ink have relatively small viscosity increase factors, the resulting image quality may be slightly degraded. By controlling the viscosities so that at least either of the inks has a relatively large viscosity increase factor, a certain level or more of image quality can be ensured.

6. Amount of Inks Applied in the Printing Method

When the treatment liquid, the white ink, and the non-white ink are applied onto a printing region of a printing medium, the printing region may include an area onto which the treatment liquid is applied in a proportion of from 3.0% by mass to 60.0% by mass, for example, from 4.0% by mass to 55.0% by mass or from 5.0% by mass to 50.0% by mass, relative to the total mass of the white ink and the non-white ink. By forming such an area, the resulting image quality can be further improved.

An application of the treatment liquid in a proportion of from 3.0% by mass to 60.0% by mass relative to the total mass of the white ink and the non-white ink implies that the printing region of the printing medium has an area onto which the treatment liquid, the white ink, and the non-white ink are applied in such a proportion. In other words, the printing region of the printing medium may include other areas.

In the printing region onto which the treatment liquid, the white ink, and the non-white ink are to be applied, the area onto which the white ink and the non-white ink are applied in the largest proportion in total may receive the treatment liquid in a proportion of from 3.0% by mass to 60.0% by mass relative to the total mass of the white ink and the non-white ink.

7. Order of Steps of the Printing Method and Modification of the Method

The order of the white ink application step and the non-white ink application step is not particularly limited. In some embodiments, however, the white ink may be applied before applying the non-white ink. Thus, the white ink forms the background of an image to be printed on a printing medium, and then the non-white ink forms the foreground of the image. The resulting image thus formed has a high definition and image quality.

The treatment liquid may be applied before the white ink application step and the non-white ink application step. Thus, the flocculant in the treatment liquid is caused to react directly with the white ink. In addition, another treatment liquid application step may be performed after the white ink application step and before the non-white ink application step. Thus, the flocculant in the treatment liquid becomes likely to react directly with the white ink. Also, the flocculant in the treatment liquid is caused to react directly with the non-white ink.

Although the post-application heating is performed after the treatment liquid application step, the white ink application step, and the non-white ink application step, the printing medium may be further heated during at least one of the application steps of the treatment liquid, the white ink, and the non-white ink. Hence, the printing method may further include a heating step of heating the printing medium so that at least any of the inks and the treatment liquid is applied onto the printing medium heated with, for example, a platen heater. Furthermore, the printing method may include a further heating step between any two steps of the treatment liquid application, the white ink application, and the non-white ink application. The surface temperature of the printing medium that is receiving the inks or the treatment liquid may be from 25.0° C. to 45° C., for example, from 30.0° C. to 40° C. or from 32.0° C. to 38° C.

In the printing method in an embodiment of the present disclosure, a percentage of evaporable constituents in the treatment liquid and one of the inks that have been applied before the other ink is applied is evaporated. The ratio, at the time when the application of one of the inks to be applied after the other is started, of the mass of the constituents evaporated from the treatment liquid and ink that have been applied in the previous applications to the mass of evaporable constituents in the treatment liquid and ink that have been applied in the previous applications is defined as the percentage of evaporation (also referred to as the percentage of first coat dry). One of the white ink application step and the non-white ink application step is a subsequent ink application step performed after the other step, and the percentage of evaporation of evaporable constituents at the time when the subsequent ink application is started may be from 30.0% by mass to 98.0% by mass, for example, from 35.0% by mass to 95.0% or from 50.0% by mass to 90.0% by mass by mass. When the percentage of evaporation is in such a range, high-quality images can be formed, and the resulting images do not easily crack.

The evaporable constituents include water and organic solvents, and the mass of the evaporable constituents is determined as a decrease in mass of a printing medium that has received such amounts of the ink and the treatment liquid as are appropriate for printing and heated at 100° C. for 5 min.

8. Printing Medium

The printing medium on which images are formed by the printing method according to an embodiment of the disclosure may have or may not have a printing surface absorbent of liquid, such as ink and the treatment liquid. Examples of the printing medium include, but are not limited to, liquid-absorbent printing media made of paper, plastic film, or cloth, poorly liquid-absorbent printing media such as book-printing paper, and non-liquid-absorbent printing media made of metal, glass, polymer, or the like. However, the printing method disclosed herein produces a significant effect when images are printed on a poorly liquid-absorbent or non-liquid-absorbent printing medium.

A poorly liquid-absorbent or non-liquid-absorbent printing medium mentioned herein refers to a printing medium that hardly absorbs or does not absorb the inks and the treatment liquid. Quantitatively, the non-liquid-absorbent or poorly liquid-absorbent printing medium exhibits a water absorption of 10 mL/m$^2$ or less for a period of 30 ms$^{1/2}$ from the beginning of contact with water, measured by the Bristow's method. The Bristow's method is broadly used for measuring liquid absorption in a short time, and Japan Technical Association of the Pulp and Paper Industry (JAPAN TAPPI) officially adopts this method. Details of this method are specified in Standard No. 51 of "JAPAN TAPPI Kami Pulp Shiken Hou 2000-nen Ban" (JAPAN TAPPI Pulp and Paper Test Methods, edited in 2000). In contrast, liquid-absorbent printing media are those not belonging to the category of non-liquid-absorbent or poorly liquid-absorbent printing media. In the description disclosed herein, a poorly liquid-absorbent or non-liquid-absorbent printing medium may be simply referred to as a poorly absorbent or non-absorbent printing medium.

The non-liquid-absorbent printing medium may be a medium including a paper sheet or any other substrate and a plastic film coating the substrate, a medium including a paper sheet or any other substrate and a plastic film bonded onto the substrate, or a plastic film not provided with an absorbent layer (liquid-receiving layer). The term plastic mentioned here may be polyvinyl chloride, polyethylene terephthalate, polycarbonate, polystyrene, polyurethane, polyethylene, or polypropylene.

The poorly liquid-absorbent printing medium may be provided with a coating layer (liquid-receiving layer) operable to receive inks and the treatment liquid on the surface thereof. The poorly liquid-absorbent printing medium whose substrate is paper may be a book-printing paper, such as art paper, coated paper, or matte paper, and the poorly liquid-absorbent printing medium whose substrate is plastic may be a film of polyvinyl chloride, polyethylene terephthalate, polycarbonate, polystyrene, polyurethane, polyethylene, polypropylene, or the like coated with a hydrophilic polymer or a coating formed by applying silica or titanium particles together with a binder.

The printing medium may be transparent and colorless, translucent, colored and transparent, colored and opaque, or non-colored and opaque. The printing medium itself may be colored or may be transparent or translucent. In this instance, a white ink may be used for the background of the printed image as a concealing layer to hide the color of the printing medium. Also, for printing, for example, a color image, an ink used for the background of the color image may be applied in advance onto the region where the color image will be printed, thus enhancing the color development of the color image.

9. Ink Jet Printing Apparatus

The printing method of an embodiment of the present disclosure may use an ink jet printing apparatus including a printing head. Also, the step of applying the treatment liquid onto the printing medium may be performed with an ink jet printing apparatus as needed. The ink jet printing apparatus that may be used in the printing method disclosed herein will now be described.

The ink jet printing apparatus may be a serial type or a line type. In either case, the ink jet printing apparatus includes a printing head. The printing head ejects droplets of predetermined volumes (or masses) of the treatment liquid and inks through nozzles onto the printing medium at a predetermined timing while changing the relative position with respect to the printing medium, thus applying the treatment liquid and the inks onto the medium to form a predetermined image.

The ink jet printing apparatus used in the printing method disclosed herein may optionally include known components, such as a platen heater, a drying unit, a roll unit, and a winding device. In addition, the ink jet printing apparatus may include a transport device operable to transport the printing medium, an image-forming unit operable to print images with the treatment liquid and the inks, a drying device, and an overall drying device operable to heat and blow the printing surface.

The transport device may include, for example, a roller. The transport devices may include a plurality of rollers. A desired number of rollers are provided at desired positions, provided that the transport device can transport the printing medium. The transport device may further include a paper feed roller, a paper feed tray, a paper ejection roller, a paper ejection tray, and a platen or the like.

The image-forming unit is operable to eject the treatment liquid and the inks onto the printing surface of the printing medium to form an image layer (coating). The image-forming unit includes a printing head having nozzles. A plurality of printing heads may be used, one each for the inks, or nozzle lines of one printing head may be assigned for each of the inks.

The drying device may be used for drying the image layer formed on the printing surface or removing volatile components from the surface of the printing medium. A desired number of drying devices may be provided at appropriate positions in view of the timing of application and the path for transporting the printing medium. For drying the image layer, heat may be applied to the printing medium by heating the platen, or air is blown over the image layer on the printing medium. Both operations may be combined. More specifically, the image layer may be dried by, for example, forcible air heating, heat radiation, conduction heating, high-frequency drying, or microwave drying.

The FIGURE is a schematic view of the entirety of a serial ink jet printing apparatus that may be used in an embodiment of the present disclosure. The general operation of the ink jet printing apparatus 1 is controlled by a control unit CONT. The printing head 2 has nozzles through which the treatment liquid is ejected, and nozzles through which the inks are ejected. The printing head 2 is mounted in a carriage 9. The printing head 2 scans the printing medium M in the scanning direction a plurality of times with the operation of the carriage transfer mechanism 13 that transfers the carriage 9 in the width direction of the printing medium M. The treatment liquid and the inks are applied onto the printing medium M by being ejected through the nozzles of the printing head scanning the printing medium.

The width direction of the printing medium is the scanning direction in which the printing head 2 scans the printing medium. A pass or movement of the printing head 2 in the scanning direction is referred to as a scan.

In the embodiment disclosed herein, the scanning direction is a direction in which the carriage 9 equipped with the printing head 2 moves. The width direction of the printing medium M, that is, the S1-S2 directions, is the scanning directions MS, and the T1→T2 direction is the sub-scanning direction SS. When the printing head 2 scans the printing medium once, the printing head 2 moves in one of the directions indicated by arrows S1 and S2. By alternately repeating such scanning operation of the printing head 2 and sub-scanning operation for transporting the printing medium M, an image is printed on the printing medium M. The printing medium M is transported by a transport mechanism 14.

In the embodiment disclosed herein, the cartridge 12 operable to feed the inks and the treatment liquid to the printing head 2 includes a plurality of cartridges independent of each other. The cartridge 12 is removably mounted on the cartridge 9 equipped with the printing head 2. Each of the cartridges contains a different type of ink or the treatment liquid, and the inks and the treatment liquid are fed to the nozzles from the respective cartridges 12. Although the embodiment disclosed herein illustrates the cartridge 12 mounted on the carriage 9, a cartridge of an embodiment may be disposed at a position other than the carriage 9 so that the inks and the treatment liquid can be fed to the nozzles through a feed tube (not shown). The platen 11 may have a platen heater (not shown). In addition, the platen 11 may have a post-application heater.

The printing head 2 may have a plurality of nozzle groups arranged in the medium transport direction so that the treatment liquid, the white ink, and the non-white ink are ejected through the nozzles in the respective nozzle groups. Thus, the treatment liquid, the white ink, and the non-white ink are ejected in order from the most upstream nozzle group to the most downstream nozzle group. Alternatively, the printing head 2 may have a plurality of nozzle groups coincident in position in the medium transport direction so that the treatment liquid, the white ink, and the non-white ink are ejected through the nozzles in the respective nozzle groups. Thus, any of the treatment liquid, the white ink, and the non-white ink is ejected onto the same position in the sub-scanning direction of the printing medium in one scan.

10. Examples and Comparative Examples

The above-described embodiments of the present disclosure will now be further described in detail with reference to the following Examples. However, the implementation of the disclosed matter is not limited to the Examples. In the following description, "part(s)" and "%" are on a mass basis unless otherwise specified.

10. 1. Preparation of Treatment Liquids, White Inks, and Non-White Inks

Treatment liquids R1 to R3, white inks W1 to W10, and non-white inks C1 and C5, each having a different composition were prepared by using the constituents shown in Table 1. Each composition was prepared by stirring the constituents shown in Table 1 with a magnetic stirrer for 2 hours in a container, followed by filtering through a membrane filter of 5 μm in pore size to remove impurities and coarse particles. All the values in Table 1 are represented by mass % (percent by mass), and pure water was added so that the total of the composition came to 100% by mass. The white pigment dispersion liquid and the non-white coloring material dispersion liquid were prepared in advance as will be described below. The values in Table 1 are each the percentage on a mass basis of the solids derived from the dispersion liquid in the ink, the percentage on a mass basis of the solids derived from the resin particle emulsion in the ink, or the percentage on a mass basis of the solids derived from the wax emulsion.

Preparation of White Pigment Dispersion Liquid

In 155 parts by mass of ion-exchanged water in which 0.1 part by mass of 30% ammonia solution (neutralizer) was dissolved, 4 parts by mass of acrylic acid-acrylic ester copolymer (weight average molecular weight: 25,000, acid value: 18) was dissolved as the resin dispersant. Then, 40 parts by mass of titanium dioxide (C.I. Pigment White 6) that was a white pigment was added into the resin dispersant solution and dispersed with zirconia beads in a ball mill for 10 hours. Subsequently, the dispersion was filtered to remove coarse particles and impurities by centrifugal separation. The white pigment content in the resulting dispersion liquid was adjusted to 20% by mass to yield a white pigment dispersion liquid. The average particle size of the white pigment was 350 nm.

Preparation of Non-White Coloring Material Dispersion Liquid

In 160.5 parts by mass of ion-exchanged water in which 2 parts by mass of 30% ammonia solution (neutralizer) was dissolved, 7.5 parts by mass of acrylic acid-acrylic ester copolymer (weight average molecular weight: 25,000, acid value: 180) was dissolved as the resin dispersant. Then, 30 parts by mass of C.I. Pigment Blue 15:3 that was a cyan pigment was added into the resin dispersant solution and dispersed with zirconia beads in a ball mill for 10 hours. Subsequently, the dispersion was filtered to remove coarse particles and impurities by centrifugal separation. The cyan pigment content in the resulting dispersion liquid was adjusted to 15% by mass to yield a non-white coloring material (cyan pigment) dispersion liquid. The average particle size of the cyan pigment was 100 nm.

Preparation of Resin Particle Emulsion

Two emulsions (styrene-acrylic resin emulsion A and styrene-acrylic resin emulsion B) of resin particles having different glass transition temperatures (Tg) were prepared. The resin of styrene-acrylic resin emulsion A had a Tg of 70.0° C., and the resin of styrene-acrylic resin emulsion B had a Tg of 90.0° C. The glass transition temperature Tg of the resin particles was adjusted by appropriately selecting the monomers used in synthesis and the proportion thereof and measured with a differential scanning calorimeter (DSC). The solid content in each resin particle emulsion was adjusted to 40% by mass.

TABLE 1

| | | Treatment liquid | | | White ink | | | | | | | |
|---|---|---|---|---|---|---|---|---|---|---|---|---|
| | | R1 | R2 | R3 | W1 | W2 | W3 | W4 | W5 | W6 | W7 | |
| Flocculant | Cationic polymer | 4.0 | — | — | — | — | — | — | — | — | — | |
| | Polyvalent metal salt | — | 7.0 | — | — | — | — | — | — | — | — | |
| | Organic acid | — | — | 4.0 | — | — | — | — | — | — | — | |
| White pigment | Titanium dioxide MD = 300.0 nm | — | — | — | 10.0 | 10.0 | 10.0 | 10.0 | 10.0 | 10.0 | 10.0 | |
| | Titanium dioxide MD = 210.0 nm | — | — | — | — | — | — | — | — | — | — | |
| Non-white coloring material | Carbon black MD = XX.0 nm | — | — | — | — | — | — | — | — | — | — | |
| Inorganic fine particles | Silica MD = 90.0 nm | — | — | — | 0.5 | 0.5 | — | 0.5 | 0.5 | — | — | |
| | Alumina MD = 80.0 nm | — | — | — | — | — | — | — | — | 0.5 | — | |
| | Silica MD = 40.0 nm | — | — | — | — | — | — | — | — | — | 0.5 | |
| Resin particles | Styrene-acrylic A Tg = 70° C. | — | — | — | 10.0 | — | 10.0 | 10.0 | 2.0 | 10.0 | 10.0 | |
| | Styrene-acrylic B Tg = 90° C. | — | — | — | — | 10.0 | — | — | — | — | — | |
| Wax | Polyethylene wax | — | — | — | 1.0 | 1.0 | 1.0 | — | 1.0 | 1.0 | 1.0 | |
| Surfactant | Silicone surfactant | 1.0 | 1.0 | 1.0 | 1.0 | 1.0 | 1.0 | 1.0 | 1.0 | 1.0 | 1.0 | |
| Solvent | 2-Pyrrolidone | 30.0 | 30.0 | 30.0 | 10.0 | 10.0 | 10.0 | 10.0 | 10.0 | 10.0 | 10.0 | |
| | 1,4-Butanediol | 1.0 | 1.0 | 1.0 | 1.0 | 1.0 | 1.0 | 1.0 | 1.0 | 1.0 | 1.0 | |
| | 3-Methyl-1,5-pentanediol | 2.0 | 2.0 | 2.0 | 2.0 | 2.0 | 2.0 | 2.0 | 2.0 | 2.0 | 2.0 | |
| Water | Pure water | Balance | Balance | Balance | Balance | Balance | Balance | Balance | Balance | Balance | Balance | |
| | Total | 100 | 100 | 100 | 100 | 100 | 100 | 100 | 100 | 100 | 100 | |

| | | White ink | | | Non-white ink | | | | | |
|---|---|---|---|---|---|---|---|---|---|---|
| | | W8 | W9 | W10 | C1 | C2 | C3 | C4 | C5 | C6 |
| Flocculant | Cationic polymer | — | — | — | — | — | — | — | — | — |
| | Polyvalent metal salt | — | — | — | — | — | — | — | — | — |
| | Organic acid | — | — | — | — | — | — | — | — | — |
| White pigment | Titanium dioxide MD = 300.0 nm | — | 10.0 | 10.0 | — | — | — | — | — | — |
| | Titanium dioxide MD = 210.0 nm | 10.0 | — | — | — | — | — | — | — | — |

TABLE 1-continued

| | | | | | | | | | | |
|---|---|---|---|---|---|---|---|---|---|---|
| Non-white coloring material | Carbon black MD = XX.0 nm | — | — | — | 2.0 | 2.0 | 2.0 | 4.0 | 1.0 | 2.0 |
| Inorganic fine particles | Silica MD = 90.0 nm | 0.5 | 0.2 | 1.0 | — | — | — | — | — | 0.5 |
| | Alumina MD = 80.0 nm | — | — | — | — | — | — | — | — | — |
| | Silica MD = 40.0 nm | — | — | — | — | — | — | — | — | — |
| Resin particles | Styrene-acrylic A Tg = 70° C. | 10.0 | 10.0 | 10.0 | 5.0 | — | 5.0 | 10.0 | 1.0 | 5.0 |
| | Styrene-acrylic B Tg = 90° C. | — | — | — | — | 5.0 | — | — | — | — |
| Wax | Polyethylene wax | 1.0 | 1.0 | 1.0 | 1.0 | 1.0 | — | 1.0 | 1.0 | 1.0 |
| Surfactant | Silicone surfactant | 1.0 | 1.0 | 1.0 | 1.0 | 1.0 | 1.0 | 1.0 | 1.0 | 1.0 |
| Solvent | 2-Pyrrolidone | 10.0 | 10.0 | 10.0 | 25.0 | 25.0 | 25.0 | 25.0 | 25.0 | 25.0 |
| | 1,4-Butanediol | 1.0 | 1.0 | 1.0 | 1.0 | 1.0 | 1.0 | 1.0 | 1.0 | 1.0 |
| | 3-Methyl-1,5-pentanediol | 2.0 | 2.0 | 2.0 | 2.0 | 2.0 | 2.0 | 2.0 | 2.0 | 2.0 |
| Water | Pure water | Balance | Balance | Balance | Balance | Balance | Balance | Balance | Balance | Balance |
| | Total | 100 | 100 | 100 | 100 | 100 | 100 | 100 | 100 | 100 |

The materials shown in Table 1 are as follows:

Flocculant: Catiomaster PD-7 (cationic polymer), polyamine resin (epichlorohydrin-amine derivative resin) produced by Yokkaichi Chemical Flocculant: Magnesium sulfate heptahydrate (polyvalent metal salt)

Flocculant: Malonic acid (organic acid)

Resin particles: styrene-acrylic resin A, adjusted to a Tg of 70.0° C.

Resin particles: styrene-acrylic resin B, adjusted to a Tg of 90.0° C.

Wax: AQUACER 539 (polyethylene wax) produced by BYK

Surfactant: Silicone surfactant BYK 348, produced by BYK

For the white pigment and the inorganic fine particles, each of commercially available titanium dioxide, silica, and alumina was crushed or pulverized and sized into the volume average particle size (MD) shown in Table 1. The volume average particle size used herein is the average particle size D50 on a volume basis measured with Microtrac UPA manufactured by Nikkiso.

10. 2. Evaluation 10. 2. 1. Preparation of Printed Items

A transparent vinyl chloride medium E1000ZC (manufactured by Lintec Corporation) was used as the printing medium. The head was charged with a treatment liquid, a white ink, and a non-white ink. A test pattern was printed on the printing medium by applying the treatment liquid, the white ink, and the non-white ink in the application order shown in Table 2 or 3 so as to superpose each other. The amount of each application of the treatment liquid and the inks was adjusted to the value shown in Table 2 or 3 at a basic resolution of 1440 dpi×1400 dpi.

A Seiko Epson ink jet printer SC-540650 was modified by being provided with a drying mechanism. The platen heater was used as a heater for primary heating. For post-application heating, an infrared radiation mechanism was provided downstream in the medium transport direction. The post-application heating was performed for about 30 seconds. The surface temperatures of the printing medium in the application steps and during secondary heating (post-application heating, drying step) were controlled to the temperatures shown in Table 2 or 3. In each heating step, air was blown onto the printing medium with a fan. The surface temperature of the printing medium was the highest temperature in each heating step. The surface of the printing medium may have a lower temperature than the shown temperature for a period in the heating step.

The treatment liquid, the white ink, and the non-white ink in each of the Examples, Comparative Examples, and Reference Examples shown in Tables 2 and 3 were introduced into the respective cartridges of the printer.

For printing, two application orders were used. Example 14 was performed in application order 2, and the others were performed in application order 1. In application order 1, treatment liquid 1 (first application of the treatment liquid), a first coat ink (white ink), treatment liquid 2 (second application of the treatment liquid), a second coat ink (non-white ink) were applied in this order onto the printing medium. In application order 2, treatment liquid 1 (treatment liquid for the first application), a first coat ink (non-white ink), treatment liquid 2 (treatment liquid for the second application), and a second coat ink (white ink) were applied in this order onto the printing medium. The treatment liquids used in the first and the second application were the same. The printing head had four nozzle lines (nozzle groups) arranged in the medium transport direction. For application order 1, the nozzle lines were charged with the treatment liquid, the white ink, the treatment liquid, and the non-white ink in this order from the most upstream line to the most downstream line. For application order 2, the nozzle lines were charged with the treatment liquid, the non-white ink, the treatment liquid, and the white ink in this order from the most upstream line to the most downstream line.

In the Examples and Comparative Examples, the treatment liquid for the first application, the treatment liquid for the second application, the white ink, and the non-white ink were each applied in 8 passes. For such operation, the distance of one sub-scan (one movement in the sub-scanning direction for medium transport) was set to one-eighth of the measure in the sub-scanning direction of one nozzle line of the head. In the Reference Examples, in contrast, both the white ink nozzle line and the non-white ink nozzle line were charged with either the white ink or the non-white ink so that only either the white ink or the non-white ink was used, and, accordingly, only one of the inks was applied in 16 passes.

TABLE 2

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Treatment liquid and Inks | Treatment liquid | R1 | R1 | R2 | R3 | R1 | R1 | R1 | R1 | R1 | R1 | R1 | R1 | R1 |
| | White ink | W1 | W1 | W1 | W1 | W1 | W1 | W1 | W1 | W1 | W4 | W1 | W5 | W5 |
| | Non-white ink | C1 | C1 | C1 | C1 | C1 | C4 | C1 | C1 | C1 | C1 | C3 | C5 | C1 |
| Amount of application (mg/inch$^2$) | Treatment liquid 1 | 1.50 | 1.50 | 1.50 | 1.50 | 3.75 | 1.50 | 1.50 | 1.50 | 1.50 | 1.50 | 1.50 | 1.50 | 1.50 |
| | 1st coating ink | 15.0 | 15.0 | 15.0 | 15.0 | 15.0 | 15.0 | 15.0 | 15.0 | 15.0 | 15.0 | 15.0 | 15.0 | 15.0 |
| | Treatment liquid 2 | 1.50 | 1.50 | 1.50 | 1.50 | 3.75 | 1.50 | 1.50 | 1.50 | 1.50 | 1.50 | 1.50 | 1.50 | 1.50 |
| | 2nd coating ink | 15.0 | 15.0 | 15.0 | 15.0 | 15.0 | 15.0 | 15.0 | 15.0 | 15.0 | 15.0 | 15.0 | 15.0 | 15.0 |
| Application order | | 1 | 1 | 1 | 1 | 1 | 1 | 1 | 1 | 1 | 1 | 1 | 1 | 1 |
| Percentage of applied treatment liquid (relative to ink) | | 10.0 | 10.0 | 10.0 | 10.0 | 25.0 | 10.0 | 10.0 | 10.0 | 10.0 | 10.0 | 10.0 | 10.0 | 10.0 |
| Printing medium temperature (° C.) in application | | 35.0 | 35.0 | 35.0 | 35.0 | 35.0 | 35.0 | 25.0 | 45.0 | 35.0 | 35.0 | 35.0 | 35.0 | 35.0 |
| Percentage of 1st coat dry (mass basis) | | 80.0 | 95.0 | 80.0 | 80.0 | 80.0 | 80.0 | 30.0 | 85.0 | 80.0 | 80.0 | 80.0 | 80.0 | 80.0 |
| Printing medium temperature (° C.) in post-application heating | | 90.0 | 90.0 | 90.0 | 90.0 | 90.0 | 90.0 | 90.0 | 90.0 | 70.0 | 90.0 | 90.0 | 90.0 | 90.0 |
| Factor of viscosity increase | White ink | 3.0 | 3.0 | 3.0 | 3.0 | 3.0 | 3.0 | 3.0 | 3.0 | 3.0 | 3.0 | 3.0 | 1.1 | 1.1 |
| | Non-white ink | 5.0 | 5.0 | 5.0 | 5.0 | 5.0 | 10.0 | 5.0 | 5.0 | 5.0 | 5.0 | 5.0 | 1.7 | 5.0 |
| Evaluation | Superposed image quality | A | A | A | B | A | A | B | A | A | A | A | C | A |
| | Anti-crack | A | C | B | B | B | C | A | B | B | B | B | A | B |
| | Ejection stability | A | A | A | A | B | C | A | C | A | A | A | A | A |
| | Rub fastness | A | A | A | A | B | A | A | A | B | B | B | C | B |

TABLE 3

| | | Example | | | | | | | |
|---|---|---|---|---|---|---|---|---|---|
| | | 14 | 15 | 16 | 17 | 18 | 19 | 20 | 21 |
| Treatment liquid and Inks | Treatment liquid | R1 | R1 | R1 | R1 | R1 | R1 | R1 | R1 |
| | White ink | W5 | W1 | W2 | W6 | W7 | W8 | W9 | W10 |
| | Non-white ink | C1 | C1 | C2 | C1 | C1 | C1 | C1 | C1 |
| Amount of application (mg/inch$^2$) | Treatment liquid 1 | 1.50 | 6.00 | 1.50 | 1.50 | 1.50 | 1.50 | 1.50 | 1.50 |
| | 1st coating ink | 15.0 | 15.0 | 15.0 | 15.0 | 15.0 | 15.0 | 15.0 | 15.0 |
| | Treatment liquid 2 | 1.50 | 6.00 | 1.50 | 1.50 | 1.50 | 1.50 | 1.50 | 1.50 |
| | 2nd coating ink | 15.0 | 15.0 | 15.0 | 15.0 | 15.0 | 15.0 | 15.0 | 15.0 |
| Application order | | 2 | 1 | 1 | 1 | 1 | 1 | 1 | 1 |
| Percentage of applied treatment liquid (relative to ink) | | 10.0 | 40.0 | 10.0 | 10.0 | 10.0 | 10.0 | 10.0 | 10.0 |
| Printing medium temperature (° C.) in application | | 35.0 | 35.0 | 35.0 | 35.0 | 35.0 | 35.0 | 35.0 | 35.0 |
| Percentage of 1st coat dry (mass basis) | | 80.0 | 80.0 | 80.0 | 80.0 | 80.0 | 80.0 | 80.0 | 80.0 |
| Printing medium temperature (° C.) in post-application heating | | 90.0 | 90.0 | 70.0 | 90.0 | 90.0 | 90.0 | 90.0 | 90.0 |

TABLE 3-continued

|  |  | | | | | | | | |
|---|---|---|---|---|---|---|---|---|---|
| Factor of viscosity increase | White ink | 1.1 | 3.0 | 3.0 | 3.0 | 3.0 | 3.0 | 3.0 | 3.0 |
|  | Non-white ink | 5.0 | 5.0 | 5.0 | 5.0 | 5.0 | 5.0 | 5.0 | 5.0 |
| Evaluation | Superposed image quality | B | A | A | A | A | A | A | A |
|  | Anti-crack | A | C | C | B | B | A | C | A |
|  | Ejection stability | A | A | A | A | A | A | B | A |
|  | Rub fastness | C | C | C | A | A | B | A | B |

|  |  | Example | Comparative Example | | | Reference Example | |
|---|---|---|---|---|---|---|---|
|  |  | 22 | 1 | 2 | 3 | 1 | 2 |
| Treatment liquid and Inks | Treatment liquid | R1 | — | — | R1 | R1 | R1 |
|  | White ink | W9 | W4 | W3 | W3 | W3 | — |
|  | Non-white ink | C6 | C1 | C1 | C1 | — | C1 |
| Amount of application (mg/inch$^2$) | Treatment liquid 1 | 1.50 | 1.50 | 1.50 | 1.50 | 3.00 | — |
|  | 1st coating ink | 15.0 | 15.0 | 15.0 | 15.0 | 30.0 | — |
|  | Treatment liquid 2 | 1.50 | 1.50 | 1.50 | 1.50 | — | 3.00 |
|  | 2nd coating ink | 15.0 | 15.0 | 15.0 | 15.0 | — | 30.0 |
| Application order |  | 1 | 1 | 1 | 1 | 1 | 1 |
| Percentage of applied treatment liquid (relative to ink) |  | 10.0 | 10.0 | 10.0 | 10.0 | 10.0 | 10.0 |
| Printing medium temperature (° C.) in application |  | 35.0 | 35.0 | 35.0 | 35.0 | 35.0 | 35.0 |
| Percentage of 1st coat dry (mass basis) |  | 80.0 | 80.0 | 80.0 | 80.0 | 80.0 | 80.0 |
| Printing medium temperature (° C.) in post-application heating |  | 90.0 | 90.0 | 90.0 | 90.0 | 90.0 | 90.0 |
| Factor of viscosity increase | White ink | 3.0 | 3.0 | 3.0 | 3.0 | 3.0 | — |
|  | Non-white ink | 5.0 | 5.0 | 5.0 | 5.0 | — | 5.0 |
| Evaluation | Superposed image quality | A | D | D | A | A | A |
|  | Anti-crack | B | A | B | D | A | A |
|  | Ejection stability | B | A | A | B | A | A |
|  | Rub fastness | A | A | A | A | A | A |

10. 2. 2. Evaluation 10. 2. 2. 1. First Coat Dry

The percentage of first coat dry (evaporation) was determined. For example, in the case of application order 1, the percentage of evaporation of evaporable constituents from the first applied treatment liquid, the white ink, and the secondly applied treatment liquid is expressed on a mass basis (% by mass or mass %).

More specifically, the first coat dry was measured as below.

In each Example using application order 1, the treatment liquid and the white ink were applied onto the printing medium (the same medium for all the Examples), and the mass of the printing medium that had received the treatment liquid and the white ink was measured before and after heating at 100° C. for 5 minutes. The decrease in mass of the printing medium was defined as the mass of evaporable constituents.

Also, in the case of application order 1, the treatment liquid and the white ink were applied onto the printing medium (the same medium for all the Examples), and then the printing medium was heated at the same temperature as in the applications. This heating was performed until immediately before the application of the non-white ink was started, and the mass of the printing medium at this time was measured.

The first coat dry is the decrease in mass of the printing medium until immediately before the application of the non-white ink was started and is represented in percentage. The percentage of applied treatment liquid shown in Tables 2 and 3 represents the percentage of the mass of the applied treatment liquid relative to the mass of the applied ink.

In Example 2, after the second application of the treatment liquid, the printing medium was removed from the printing apparatus and dried to the percentage of first coat dry shown in Table 2 by heating in an oven, followed by being returned to the printing medium. Then, the second coat ink was applied onto the printing medium. In the other Examples, the printing medium was heated at the same temperature as the printing medium temperature in application shown in Tables 2 or 3 with optional adjustment of time until the application of the second coat ink, thus being dried to the percentage of the first coat dry shown in the Table. The percentages of first coat dry are shown in Tables 2 and 3.

10. 2. 2. 2. Superposed Image Quality

The printed items produced in the Examples were observed visually and through a loupe from over the printing medium. For example, the printed items produced in application order 1 were observed from the printed side of the printing medium having the non-white ink at the surface. The image quality of the printed items was rated according to the following criteria, and the results are shown in Tables 2 and 3.

A: There was no bleeding in the printed image. Bleeding was not seen visually or through a loupe.

B: Bleeding was not visually seen but was seen through a loupe.

C: Small bleeding was visually seen.

D: Large bleeding was visually seen.

10. 2. 2. 3. Cracks

The printed items produced in the Examples were observed visually and through a loupe from both the upper and the lower side of the printing medium. Both sides of the printing medium were observed for evaluation and rated according to the following criteria. Table 2 and 3 show the results on the worse side. The larger the amount of applied ink, the more cracks are likely to occur. Accordingly, the amounts of applied inks were varied for evaluation.

A: No cracks were seen in the image.

B: One or more cracks were seen in the image. However, when the amounts of applied treatment liquid and inks were reduced to 80% by mass of the values shown in the Table, no cracks were seen.

C: Even when the amounts of applied treatment liquid and inks were reduced to 80% by mass of the value shown in the Table, cracks were seen. However, when the amounts of applied treatment liquid and inks were reduced to 60% by mass of the values shown in the Table, no cracks were seen.

D: Even when the amounts of applied treatment liquid and inks were reduced to 60% by mass of the values shown in the Table, cracks were seen.

10. 2. 2. 4. Ejection Stability

After image printing was continuously performed for 1 hour under the image forming conditions, the nozzle lines of the white ink and the non-white ink (360 nozzles for each ink) were checked, and the results rated according to the following criteria are shown in Tables 2 and 3. For Examples using both a white ink and a non-white ink, the average of the white ink nozzle line of the non-white ink nozzle line was evaluated.

A: There was no nozzle that failed in ejection.

B: 2% or less of the nozzles failed in ejection.

C: More than 2% to 4% of the nozzles failed in ejection.

C: More than 4% of the nozzles failed in ejection.

10. 2. 2. 5. Rub Fastness

After the printed item produced in each Example was dried at 80° C. for 10 minutes, the rub fastness of the printed item was measured with a Gakushin-type rubbing tester AB-301 (manufacture by TESTER SANGYO). More specifically, the surface of the image printed on the printing medium was reciprocally rubbed 10 times at a load of 500 g with a rubber provided with a white cloth (according to JIS L 0803). The degree of peeling of the image (coating) from the surface of the printing medium was visually observed and rated according to the following criteria. The results are shown in Tables 2 and 3.

A: The coating was not peeled.

B: The coating was peeled, but the area of the peeling was 10 percent to the area observed.

C: The coating was peeled in an area of more than 10 percent relative to the area observed.

10. 3. Evaluation Results

The results of the Examples, the comparative Examples, and the Reference Examples suggest the following.

The Examples including the white ink application step, the non-white ink application step, and the treatment liquid application step, wherein the white ink contained a white pigment and inorganic fine particles having a smaller volume average particle size than the white pigment, produced satisfactory results in terms of superposed image quality and anti-cracking. On the other hand, in the Comparative Examples not according to the printing method disclosed herein, either superposed image quality or anti-cracking was not satisfactory. These results suggest that a process including the white ink application step, the non-white ink application step, and the treatment liquid application step can produce satisfactory results in image quality and anti-cracking. The results will be described in detail.

The results of Examples 1, 2, and 7 show that a favorable anti-cracking property was produced when the percentage of first coat dry was not too high, and that high image quality was produced when the percentage of first coat dry was not too low.

The results of Example 6 suggest that a favorable anti-cracking property and ejection stability can be obtained when the difference in viscosity increase factor is not too large.

The results of Example 8 suggest that a favorable ejection stability can be obtained when the printing medium temperature in application is not too high.

The results of Example 12 suggest that the image quality and the rub fastness are slightly inferior when both the viscosity increase factors of the white ink and the non-white ink are low. In contrast, the results of Example 13 suggest that even when the viscosity increase factor of the white ink is low, high image quality and rub fastness can be produced provided that the viscosity increase factor of the non-white ink is high.

The results of Example 14 show that satisfactory image quality and anti-cracking property were obtained even though the order of applications of the white ink and the non-white ink was reversed. In this Example, however, the rub fastness was slightly inferior because the surface of the printed image was formed with the white ink that was inferior in rub fastness to the non-white ink. Also, from the results of Examples 13 and 14, it is assumed that a better anti-cracking property can be obtained when the ink applied after the other ink has a lower viscosity increase factor than the other ink.

In Example 15, in which a large amount of treatment liquid was applied, the flocculation degree of the first coat, or the white ink, was increased, and, accordingly, the anti-cracking property and rub fastness were slightly reduced.

The results of Example 16 suggest that when the Tg of the resin particles is higher than the post-application heating temperature, the resin is not sufficiently melted, and the anti-cracking property and rub fastness are slightly reduced.

The results of Example 20 show that the anti-cracking property was not degraded much even though the inorganic fine particle content in the white ink was low.

The results of Examples 1 to 3 show that the use of the treatment liquid containing a cationic polymer as the flocculant resulted in satisfactory anti-cracking.

On the other hand, Comparative Examples 1 and 2, which did not include the treatment liquid application step, resulted in poor superposed image quality.

Comparative Example 3, in which a white ink not containing inorganic fine particles was used in the white ink application step, resulted in poor anti-cracking.

In Comparative Example 2, anti-cracking was not inferior even though a white ink not containing inorganic fine particles was used in the white ink application step. This suggests that use of a treatment liquid in such a case results in poor anti-cracking.

The Reference Examples, which did not include either the white ink application step or the non-white ink application step, resulted in satisfactory image quality and anti-cracking.

The implementation of the matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. A printing method comprising:
   a white ink application step of ejecting a white ink from a printing head to apply the white ink onto a printing medium;
   a non-white ink application step of ejecting a non-white ink containing a non-white coloring material from a printing head to apply the non-white ink onto the printing medium; and
   a treatment liquid application step of applying a treatment liquid containing a flocculant onto the printing medium,
   wherein the white ink contains a titanium oxide white pigment and inorganic fine particles having a smaller volume average particle size than the white pigment, the inorganic fine particles being selected from the group consisting of silica, alumina, zirconia, and zinc oxide.

2. The printing method according to claim 1, wherein the inorganic fine particles are transparent.

3. The printing method according to claim 1, wherein the white pigment has a volume average particle size of from 150.0 nm to 400.0 nm, and the inorganic particles have a volume average particle size of from 10.0 nm to 100.0 nm.

4. The printing method according to claim 1, wherein the white ink containing 1.0 parts by mass to 20.0 parts by mass of the inorganic fine particles relative to 100 parts by mass of the white pigment.

5. The printing method according to claim 1, wherein the treatment liquid contains a cationic polymer as the flocculant.

6. The printing method according to claim 1, wherein the white ink, the non-white ink, a mixture of the white ink and the treatment liquid, and a mixture of the non-white ink and the treatment liquid have respective viscosities, and the ratio of the viscosity of the mixture of the white ink and the treatment liquid to the viscosity of the white ink has a difference of 5.0 or less from the ratio of the viscosity of the mixture of the non-white ink and the treatment liquid to the viscosity of the non-white ink.

7. The printing method according to claim 1, wherein at least one of the white ink and the non-white ink contains a wax.

8. The printing method according to claim 1, wherein the printing medium includes a printing region having an area onto which treatment liquid is applied in a proportion of from 5.0% by mass to 50.0% by mass relative to the total mass of the white ink and the non-white ink applied onto the area.

9. The printing method according to claim 1, wherein the treatment application step is performed before the white ink application step and the non-white ink application step.

10. The printing method according to claim 1, wherein the white ink application step is performed before the non-white ink application step.

11. The printing method according to claim 1, further comprising a post-application heating step of heating the printing medium after the treatment liquid application step, the white ink application step, and the non-white ink application step.

12. The printing method according to claim 1, wherein one of the white ink application step and the non-white ink application step is a subsequent ink application step performed after the other, and a percentage of evaporable constituents in the treatment liquid and ink that are applied before the subsequent ink application step are evaporated, the percentage being from 50.0% by mass to 90.0% by mass at the time when the subsequent ink application step is started.

13. A printing apparatus configured to perform the printing method as set forth in claim 1.

* * * * *